United States Patent
Ito et al.

(10) Patent No.: US 11,863,883 B2
(45) Date of Patent: Jan. 2, 2024

(54) IMAGING DEVICE, ELECTRONIC DEVICE, AND INFORMATION PROCESSING METHOD

(71) Applicant: SONY GROUP CORPORATION, Tokyo (JP)

(72) Inventors: Atsushi Ito, Tokyo (JP); Ilya Reshetouski, Tokyo (JP); Hideki Oyaizu, Tokyo (JP); Kenichiro Nakamura, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/595,582

(22) PCT Filed: May 20, 2020

(86) PCT No.: PCT/JP2020/020014
§ 371 (c)(1),
(2) Date: Nov. 19, 2021

(87) PCT Pub. No.: WO2020/241427
PCT Pub. Date: Dec. 3, 2020

(65) Prior Publication Data
US 2022/0224866 A1    Jul. 14, 2022

(30) Foreign Application Priority Data
May 31, 2019 (JP) .................. 2019-102722

(51) Int. Cl.
*H04N 25/13* (2023.01)
*H04N 23/84* (2023.01)
*H04N 25/615* (2023.01)

(52) U.S. Cl.
CPC ......... *H04N 25/135* (2023.01); *H04N 23/843* (2023.01); *H04N 25/6153* (2023.01)

(58) Field of Classification Search
CPC .. G02B 5/20; H04N 9/04515; H04N 9/04519; H04N 9/04553; H04N 9/04559;
(Continued)

(56) References Cited

U.S. PATENT DOCUMENTS

2007/0216785 A1    9/2007  Nomura et al.
2010/0091147 A1    4/2010  Nomura et al.
(Continued)

FOREIGN PATENT DOCUMENTS

CN    106507065 A    3/2017
JP    2007-251393 A   9/2007
(Continued)

OTHER PUBLICATIONS

International Search Report and Written Opinion of PCT Application No. PCT/JP2020/020014, dated Jul. 21, 2020, 09 pages of ISRWO.

(Continued)

*Primary Examiner* — Antoinette T Spinks
(74) *Attorney, Agent, or Firm* — CHIP LAW GROUP

(57) ABSTRACT

An optical wavelength band to be detected is flexibly changed. An imaging device includes a coded mask including two or more kinds of band bus filters that are arranged in a two-dimensional grating pattern and that transmit light of different wavelength bands, a light receiving unit that receives modulated light modulated by the coded mask and generates observation signal data, and an image reconstruction processing unit that reconstructs the observation signal data generated by the light receiving unit to generate image data.

12 Claims, 16 Drawing Sheets

(58) Field of Classification Search
CPC .. H04N 23/843; H04N 25/131; H04N 25/135; H04N 25/6153; H04N 5/33
See application file for complete search history.

(56) References Cited

U.S. PATENT DOCUMENTS

| | | |
|---|---|---|
| 2013/0140436 A1 | 6/2013 | Nomura et al. |
| 2016/0003994 A1 | 1/2016 | Gill et al. |
| 2017/0070709 A1 | 3/2017 | Sato et al. |
| 2018/0052050 A1 | 2/2018 | Menon et al. |
| 2019/0348453 A1* | 11/2019 | Lee .................. H01L 27/14621 |

FOREIGN PATENT DOCUMENTS

| | | |
|---|---|---|
| JP | 2015-226299 A | 12/2015 |
| JP | 2017-055386 A | 3/2017 |
| JP | 2018-511253 A | 4/2018 |
| JP | 2019-080245 A | 5/2019 |
| WO | 2016/123529 A1 | 8/2016 |
| WO | 2016/154445 A1 | 9/2016 |
| WO | 2019/082462 A1 | 5/2019 |

OTHER PUBLICATIONS

Nakamura, et al. "Lensless Light-Field Imaging with Fresnel Zone Aperture", Semantic Scholar, ITE Technical Report, vol. 40, No. 40, Nov. 2016, pp. 7-8.

* cited by examiner

IMAGING DEVICE, ELECTRONIC DEVICE, AND INFORMATION PROCESSING METHOD

CROSS REFERENCE TO RELATED APPLICATIONS

This application is a U.S. National Phase of International Patent Application No. PCT/JP2020/020014 filed on May 20, 2020, which claims priority benefit of Japanese Patent Application No. JP 2019-102722 filed in the Japan Patent Office on May 31, 2019. Each of the above-referenced applications is hereby incorporated herein by reference in its entirety.

FIELD

The present disclosure relates to an imaging device, an electronic device, an information processing method, and a program.

BACKGROUND

The lensless imaging system is a technology of capturing an image using a mechanism that modulates light such as a pattern opening and a diffraction grating together with a two-dimensional image sensor without using a lens used in a conventional two-dimensional image imaging system, and reconstructing a two-dimensional image by a signal process after capturing the image, and the system realizes downsizing, weight reduction, cost reduction, non-planarization, and the like of the imaging system.

There are several types of lensless imaging systems. For example, Patent Literature 1 discloses a technique of controlling light incident on a sensor face by a pattern mask opening and separating the light at a signal process stage to form a final image.

In addition, Non Patent Literature 1 discloses a technique of realizing a lensless imaging system by Fourier transform based image reconstruction by installing a Fresnel structure mask opening.

Furthermore, Patent Literature 2 discloses a technique of modulating incident light into a sine wave shape having a phase different according to an angle thereof using a diffraction grating, capturing an image with a sensor, and reconstructing the image by the signal process to restore the image.

On the other hand, in recent years, there is an increasing need for multispectral imaging (narrowing of the wavelength of light to be acquired or custom peak position). In the medical field, in particular, in endoscopic observation and the like, a technique of making it easy to visually recognize a disease of an organ that cannot be determined with the naked eye by narrow band image observation has been put into practical use. In addition, in a vegetation index in the agricultural field, an inspection of freshness and sugar content in the food inspection field, and the like, an application that quantifies a relative value between images captured in a narrow band wavelength band is widely used.

CITATION LIST

Patent Literature

Patent Literature 1: WO 2016/123529 A
Patent Literature 2: US 2016/0003994 A

Non Patent Literature

Non Patent Literature 1: Lensless Light-field Imaging with Fresnel Zone Aperture: Yusuke Nakamura, Takeshi Shimano, Kazuyuki Tajima, Mayu Sao, Taku Hoshizawa (Hitachi, Ltd), IWISS2016

SUMMARY

Technical Problem

However, in the conventional lensless imaging system, there is a problem that the optical wavelength band to be detected cannot be flexibly changed, such as narrowing or changing the optical wavelength band.

Therefore, the present disclosure proposes an imaging device, an electronic device, an information processing method, and a program that enable flexible change in an optical wavelength band to be detected.

Solution to Problem

To solve the above-described problem, an imaging device according to one aspect of the present disclosure comprises: a coded mask including two or more kinds of band bus filters that are arranged in a two-dimensional grating pattern and that transmit light of different wavelength bands; a light receiving unit that receives modulated light modulated by the coded mask and generates observation signal data; and an image reconstruction processing unit that reconstructs the observation signal data generated by the light receiving unit to generate image data.

DESCRIPTION OF EMBODIMENTS

Figure 1:
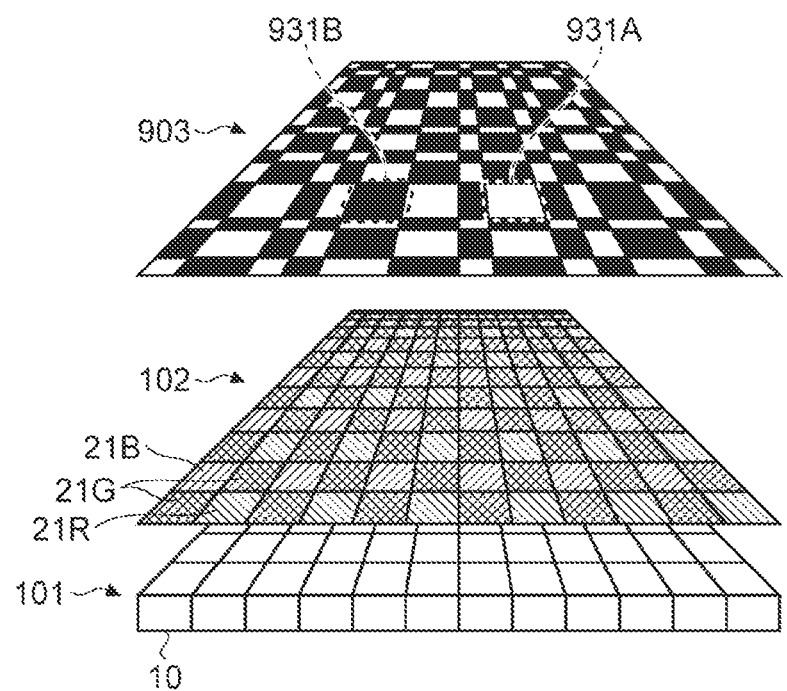
FIG. 1 is a schematic diagram illustrating a schematic configuration example of an imaging optical system according to a comparative example.

Hereinafter, an embodiment of the present disclosure will be described in detail with reference to the drawings. In the following embodiments, the same parts are designated by the same reference numerals, so that duplicate description will be omitted.

Further, the present disclosure will be described in the following item order.
1. Introduction
2. First Embodiment
2.1 Schematic configuration example of imaging optical system
2.2 Synthesis wavelength transmission characteristics
2.3 Schematic configuration example of information processing unit
2.4 Channel data reconstruction
2.5 Overall configuration example of imaging device
2.6 Action/effect
3. Second Embodiment
3.1 Schematic configuration example of imaging optical system
3.2 Synthesis wavelength transmission characteristics
3.3 Schematic configuration example of information processing unit
3.4 Weight coefficient
3.5 Action/effect
4. Example of application to endoscopic surgery system
5. Example of application to moving object 1. Introduction As described above, in the conventional lensless imaging system, although implementation of a form factor such as downsizing, weight reduction, cost reduction, and non-planarization of the imaging system, and implementation of high functionality such as control of the depth of field and wide viewing angle are achieved, there is a problem that the optical wavelength band (hereinafter, referred to as a detection wavelength band) to be detected cannot be flexibly changed, such as narrowing or changing the optical wavelength band.

In addition, in the conventional lensless imaging system, the selection of the wavelength incident on each pixel is realized using the color filter arranged on the light incident face side of each pixel. However, since a method of forming a color filter in which a basic pattern such as a Bayer array is repeated by performing similar reconstruction process on each pixel is used, it is difficult to replace each pixel with a filter having desired wavelength selection characteristics. In addition, since the color filter is formed of a material such as a dye or a pigment, there is a situation in which it is not easy to flexibly change the detection wavelength band.

Furthermore, in recent years, a method of mounting a narrow band wavelength filter on each pixel of an image sensor called a mosaic type has appeared, but the method has a problem that manufacturing cost is high and filter replacement is not easy.

Therefore, in the following embodiments, an imaging device, an electronic device, an information processing method, and a program that enable flexible change in an optical wavelength band (detection wavelength band) to be detected while suppressing manufacturing cost will be described with examples.

2. First Embodiment

First, an imaging device, an electronic device, an information processing method, and a program according to a first embodiment will be described in detail with reference to the drawings.

In the first embodiment, by combining a new wavelength selection element with a conventionally used color filter, it is possible to narrow the detection wavelength band and flexibly change the peak position (corresponding to the position of the peak wavelength in the light transmission spectrum) thereof. Furthermore, in the present embodiment, by adopting the lensless imaging system, downsizing, weight reduction, cost reduction, non-planarization, and the like of the imaging device are also realized.

Therefore, in the present embodiment, a grating pattern (hereinafter, referred to as a coded mask) designed to select light of a specific wavelength band is used as a new wavelength selection element which is combined with a color filter.

2.1 Schematic Configuration Example of Imaging Optical System

Figure 2:
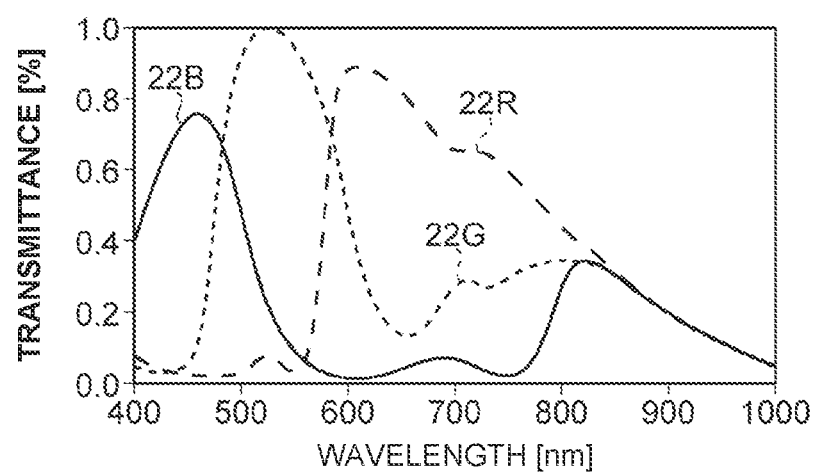
FIG. 2 is a diagram illustrating wavelength transmission characteristics of a color filter array in a Bayer array.
Figure 3:
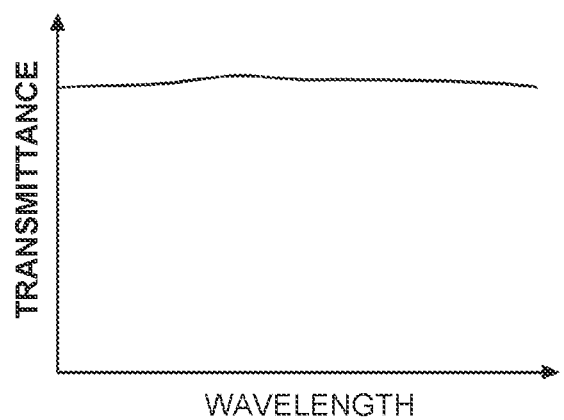
FIG. 3 is a diagram illustrating wavelength transmission characteristics of an opening portion in a grating pattern used in the comparative example.
Figure 4:
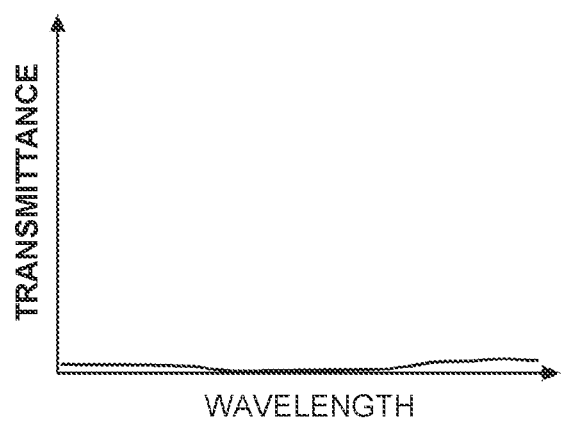
FIG. 4 is a diagram illustrating wavelength transmission characteristics of a light-shielding portion in a grating pattern used in the comparative example.

FIG. 1 is a schematic diagram illustrating a schematic configuration example of an imaging optical system according to a comparative example. FIG. 2 is a diagram illustrating wavelength transmission characteristics of a color filter array in a Bayer array. FIG. 3 is a diagram illustrating wavelength transmission characteristics of an opening portion (hereinafter, referred to as an opening portion) in a grating pattern used in the comparative example, and FIG. 4 is a diagram illustrating wavelength transmission characteristics of a light-shielding portion (hereinafter, referred to as a light-shielding portion).

Figure 5:
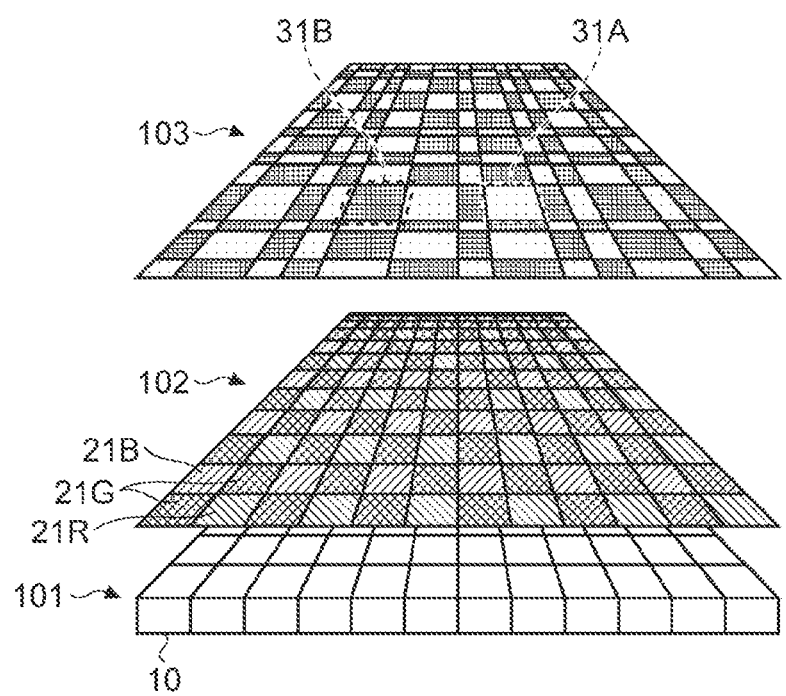
FIG. 5 is a schematic diagram illustrating a schematic configuration example of an imaging optical system according to a first embodiment.
Figure 6:
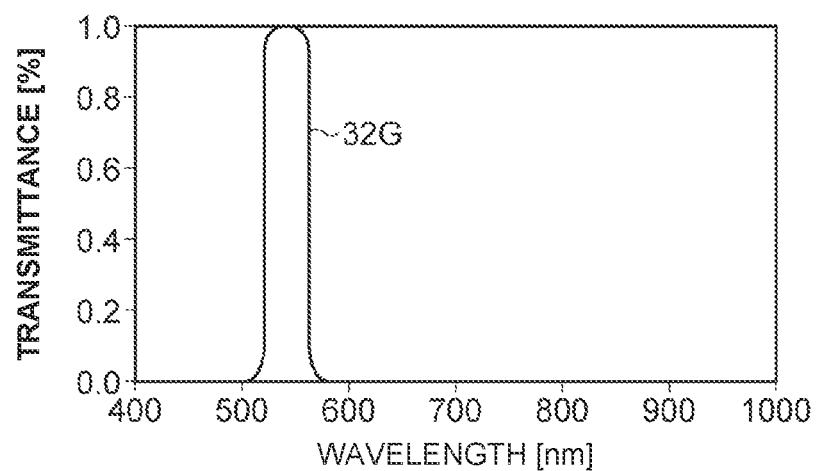
FIG. 6 is a diagram illustrating wavelength transmission characteristics of a first filter in a coded mask according to the first embodiment.
Figure 7:
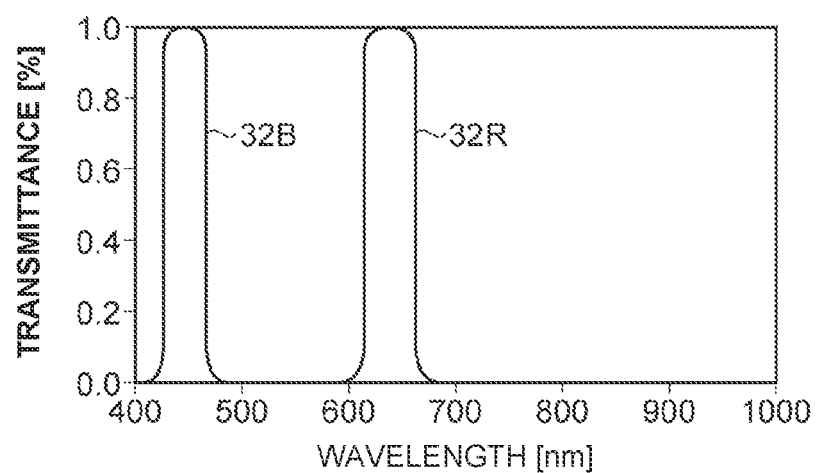
FIG. 7 is a diagram illustrating wavelength transmission characteristics of a second filter in the coded mask according to the first embodiment.

FIG. 5 is a schematic diagram illustrating a schematic configuration example of an imaging optical system according to the first embodiment. FIG. 6 is a diagram illustrating wavelength transmission characteristics of a first filter in a coded mask according to the first embodiment, and FIG. 7 is a diagram illustrating wavelength transmission characteristics of a second filter.

As illustrated in FIG. 1, an imaging optical system according to the comparative example has a configuration in which a color filter array 102 and a grating pattern 903 are disposed on a light incident face of a pixel array unit 101 in which pixels 10 that photoelectrically convert incident light and generate the electric charge are arranged in a two-dimensional grating pattern.

The color filter array 102 may be, for example, a Bayer array color filter. The color filter array 102 in the Bayer array has a structure in which, for example, a color filter 21R that selectively transmits light (R) in a red wavelength band, a color filter 21G that selectively transmits light (G) in a green wavelength band, and a color fill 21B that selectively transmits light (B) in a blue wavelength band are arranged in a two-dimensional grating pattern in a predetermined order. In this case, each color filter 21R/21G/21B may be associated with one pixel 10 or may be associated with a plurality of pixels 10.

As illustrated in FIG. 2, the color filters 21R, 21G, and 21B have wavelength transmission characteristics of different peak wavelengths. For example, the color filter 21R has wavelength transmission characteristics 22R having a peak wavelength of about 610 nm (nanometer), the color filter 21G has wavelength transmission characteristics 22G having a peak wavelength of about 520 nm, and the color filter 21B has wavelength transmission characteristics 22B having a peak wavelength of about 460 nm.

Note that the color filter array 102 is not limited to the Bayer array, and various color filter arrays such as a 3×3 pixel color filter array used in an X-Trans (registered trademark) CMOS sensor, a 4×4 pixel quad Bayer array (also referred to as a quadra array), and a 4×4 pixel color filter array (hereinafter, referred to as a white RGB array) obtained by combining a white RGB color filter with the Bayer array can be applied.

Furthermore, the grating pattern 903 according to the comparative example has a structure in which light-shielding portions 931B and opening portions 931A having different sizes are arranged in a grating pattern. In the grating pattern 903, for example, as illustrated in FIG. 3, the opening portion 931A has wavelength transmission characteristics that allow incident light to pass as it is. Therefore, for example, when the incident light is sunlight, the light passing through the opening portion 931A has a broad wavelength spectrum at least from the ultraviolet band to the infrared band.

On the other hand, the light-shielding portion 931B of the grating pattern 903 has wavelength transmission characteristics of shielding light in at least a band of the light transmitted through each of the color filters 21R, 21G, and 21B of the color filter array 102. Therefore, as illustrated in FIG. 4, the light transmitted through the light-shielding portion 931B of the grating pattern 903 is reduced to have a negligible light intensity at least in the band transmitting through each of the color filters 21R, 21G, and 21B of the color filter array 102.

As described above, the grating pattern 903 according to the comparative example includes the light-shielding portion 931B that shields substantially all the light and the opening portion 931A that transmits substantially all the light. Therefore, in a case where the grating pattern 903 and the color filter array 102 are combined, the light transmitted through the opening portion 931A is transmitted through the color filter 21R, 21G, or 21B to be converted into light having a wavelength spectrum corresponding to the wavelength transmission characteristics of the color filter 21R, 21G, or 21B, and then is incident on the pixel 10. On the other hand, the light incident on the light-shielding portion 931B is substantially shielded by the light-shielding portion 931, and is not incident on the pixel 10.

On the other hand, as illustrated in FIG. 5, the imaging optical system according to the present embodiment has a configuration in which the color filter array 102 and a coded mask 103 are disposed on the light incident face of the pixel array unit 101. The pixel array unit 101 and the color filter array 102 may be similar to those described in the comparative example.

The coded mask 103 has a structure in which first filters 31A and second filters 31B having different sizes are arranged in a grating pattern. For example, the coded mask 103 has a configuration in which the opening portion 931A according to the comparative example is replaced with the first filter 31A and the light-shielding portion 931B is replaced with the second filter 31B.

For example, as illustrated in FIG. 6, the first filter 31A may be a band pass filter having wavelength transmission characteristics 32G that selectively transmit light (G) in a narrow band (for example, in the vicinity of 540 nm) corresponding to green.

For example, as illustrated in FIG. 7, the second filter 31B may be a band pass filter including wavelength selection characteristics 32B in which light (B) in a narrow band (for example, in the vicinity of 450 nm) corresponding to blue is selectively transmitted and wavelength selection characteristics 32R in which light in a narrow band (for example, in the vicinity of 630 nm) corresponding to red is selectively transmitted.

2.2 Synthesis Wavelength Transmission Characteristics

Figure 8:
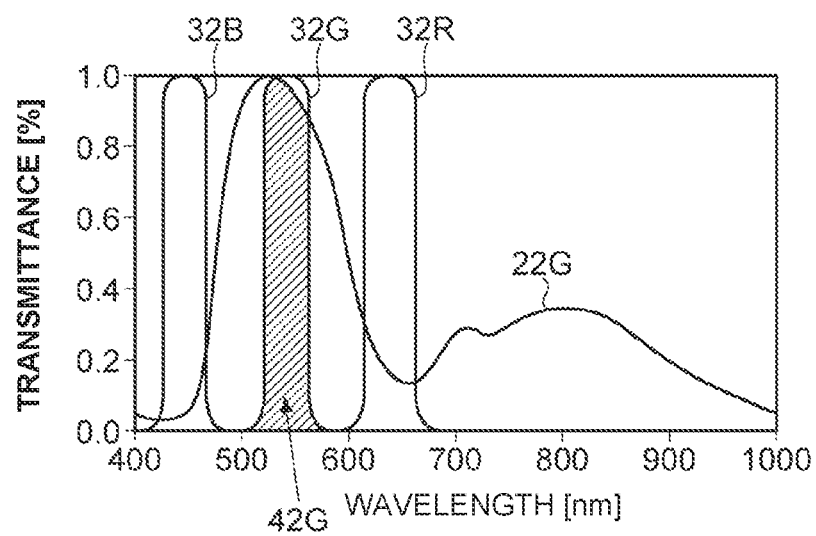
FIG. 8 is a diagram (part 1) illustrating a wavelength spectrum of modulated light transmitted through each color filter in a case where the coded mask and the color filter according to the first embodiment are combined.
Figure 9:
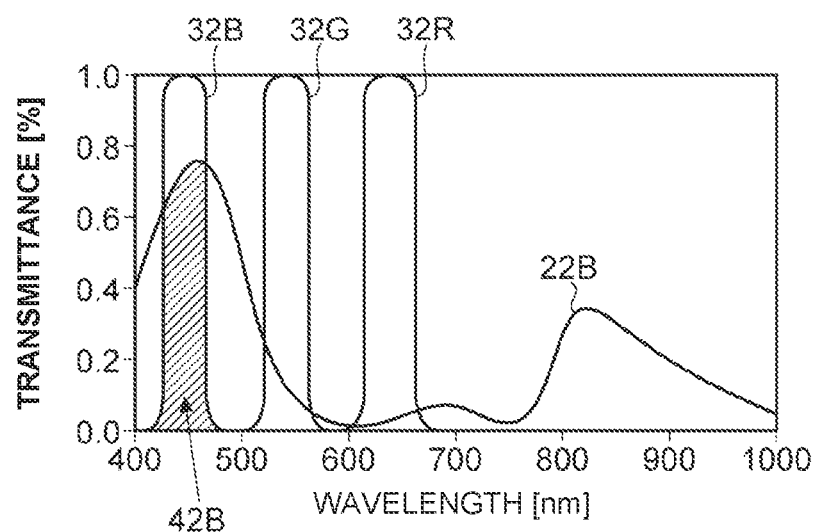
FIG. 9 is a diagram (part 2) illustrating a wavelength spectrum of modulated light transmitted through each color filter in a case where the coded mask and the color filter according to the first embodiment are combined.
Figure 10:
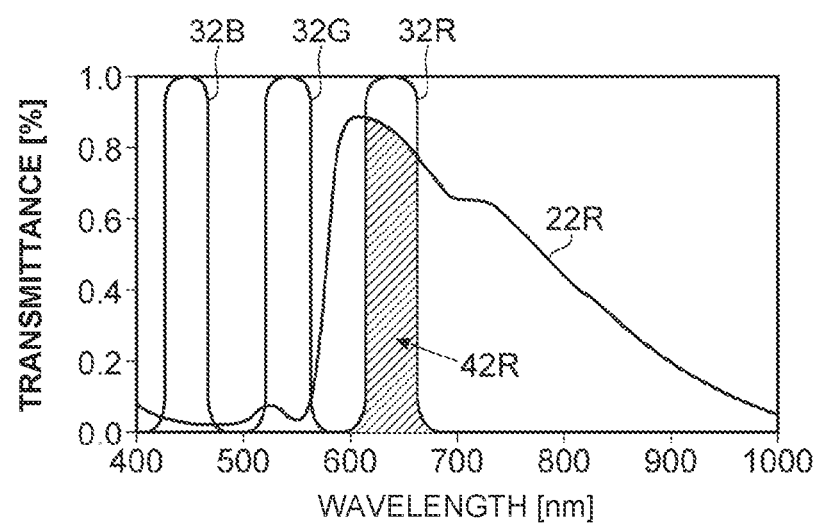
FIG. 10 is a diagram (part 3) illustrating a wavelength spectrum of modulated light transmitted through each color filter in a case where the coded mask and the color filter according to the first embodiment are combined.

FIGS. 8 to 10 are diagrams illustrating a wavelength spectrum of modulated light (hereinafter, simply referred to as light) transmitted through each color filter in a case where the coded mask and the color filter according to the first embodiment are combined. Note that FIG. 8 illustrates an example of a wavelength spectrum of light transmitted through the color filter 21G, FIG. 9 illustrates an example of a wavelength spectrum of light transmitted through the color filter 21B, and FIG. 10 illustrates an example of a wavelength spectrum of light transmitted through the color filter 21R.

Even when the coded mask 103 and the color filter array 102 are combined, light of three color components of light (G) (hereinafter, for the sake of understanding, the sign of this light is set to 32G) transmitted through the first filter 31A, light (R) (hereinafter, for the sake of understanding, the sign of this light is 32R), and light (B) (hereinafter, for the sake of understanding, the sign of this light is set to 32B)

transmitted through the second filter 31B is incident on each of the color filters 21R, 21G, and 21B.

Therefore, as illustrated in FIG. 8, the color filter 21G transmits the light 32G of the wavelength band included in the light transmission band in the wavelength transmission characteristics 22G of the color filter, and shields the light 32R and 32B outside of the light transmission band. Therefore, light incident on the pixel 10 associated with the color filter 21G is mainly light 42G having a wavelength spectrum of a region indicated by hatching in FIG. 8.

In addition, as illustrated in FIG. 9, the color filter 21B transmits the light 32B of the wavelength band included in the light transmission band of the wavelength transmission characteristics 22B of the color filter, and shields the light 32R and 32G outside of the light transmission band. Therefore, the light incident on the pixel 10 associated with the color filter 21B is mainly the light 42B having the wavelength spectrum of the region indicated by hatching in FIG. 9. Similarly, as illustrated in FIG. 10, the color filter 21R transmits the light 32R of the wavelength band included in the light transmission band of the wavelength transmission characteristics 22R of the color filter, and shields the light 32G and 32B outside of the light transmission band. Therefore, the light incident on the pixel 10 associated with the color filter 21R is mainly the light 42R having the wavelength spectrum of the region indicated by hatching in FIG. 10.

As described above, when the coded mask 103 and the color filter array 102 are combined, the wavelength spectrum of the light incident on the pixel 10 associated with each of the color filters 21R, 21G, and 21B can be basically expressed by a convolution operation of the wavelength transmission characteristics 22R, 22G, or 22B of the color filters 21R, 21G, or 21B, respectively, and the wavelength transmission characteristics 32R, 32G, and 32B of the first filter 31A and the second filter 31B of the coded mask 103.

Therefore, as illustrated in FIGS. 6 and 7, the wavelength transmission characteristics 32R, 32G, and 32B realized by the first filter 31A and the second filter 31B of the coded mask 103 are narrower than the wavelength transmission characteristics 22R, 22G, and 22B of the color filters 21R, 21G, and 21B, so that the wavelength band of the light to be detected can be narrowed.

In addition, the wavelength transmission characteristics 32R, 32G, and 32B realized by the first filter 31A and the second filter 31B of the coded mask 103 can be easily changed by changing the pitch, size, and the like of the first filter 31A and the second filter 31B. Therefore, by changing the pitch, size, and the like of the first filter 31A and the second filter 31B, the wavelength band of the light to be detected can be easily and flexibly changed to a desired band.

2.3 Schematic Configuration Example of Information Processing Unit

Next, a configuration of an information processing unit that generates original image data from image data (also referred to as observation signal data) read from the pixel array unit 101 on which the imaging optical system as described above is mounted will be described in detail with reference to the drawings. Note that the original image data may be image data in a state in which a person can recognize an object or a background within an angle of view by viewing the image, such as image data captured by a normal imaging device.

Figure 11:
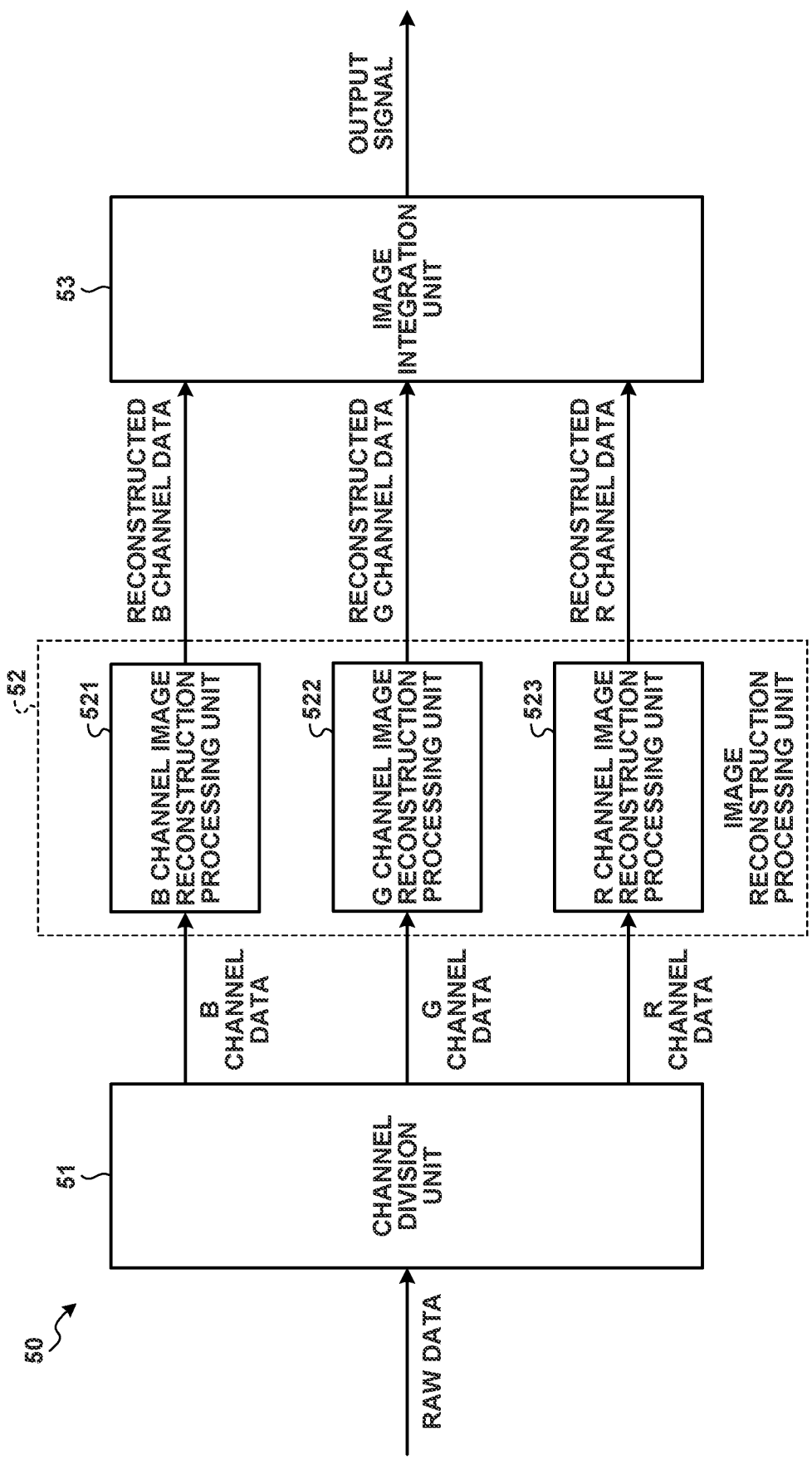
FIG. 11 is a block diagram illustrating a schematic configuration example of an information processing unit according to the first embodiment.

FIG. 11 is a block diagram illustrating a schematic configuration example of an information processing unit according to the first embodiment.

As illustrated in FIG. 11, an information processing unit 50 includes a channel division unit 51, an image reconstruction processing unit 52, and an image integration unit 53.

For example, the channel division unit 51 generates image data (R channel data, G channel data, and B channel data) for each color component (hereinafter, referred to as a channel) of red (R), green (G), and blue (B) from the image data (raw data) read from the pixel array unit 101, and inputs the generated image data to the image reconstruction processing unit 52.

For example, image data read from all the pixels 10 of the pixel array unit 101 may be input as raw data to the channel division unit 51, or R channel data, G channel data, and B channel data read by skipping the pixels 10 of the pixel array unit 101 for each channel may be input as raw data. Note that in a case where image data read from all the pixels 10 of the pixel array unit 101 is input as raw data, the channel division unit 51 may generate image data (R channel data, G channel data, and B channel data) for each channel by demosaicing the input image data.

Among the image data output from the channel division unit 51, B channel data including a pixel signal read from the pixel 10 associated with the color filter 21B that selectively transmits the blue wavelength is input to a B channel image reconstruction processing unit 521, G channel data including a pixel signal read from the pixel 10 associated with the color filter 21G that selectively transmits the green wavelength is input to a G channel image reconstruction processing unit 522, and R channel data including a pixel signal read from the pixel 10 associated with the color filter 21R that selectively transmits the red wavelength is input to an R channel image reconstruction processing unit 523.

The B channel image reconstruction processing unit 521 reconstructs the input B channel data to generate B channel data (hereinafter, referred to as reconstructed B channel data) in the original image data. The reconstruction of the channel data will be described later.

Similarly, the G channel image reconstruction processing unit 522 reconstructs the input G channel data to generate G channel data (hereinafter, referred to as reconstructed G channel data) in the original image data, and the R channel image reconstruction processing unit 523 reconstructs the input R channel data to generate R channel data (hereinafter, referred to as reconstructed R channel data) in the original image data.

The reconstructed B channel data, the reconstructed G channel data, and the reconstructed R channel data generated in this manner are input to the image integration unit 53. The image integration unit 53 restores original image data by integrating the reconstructed B channel data, the reconstructed G channel data, and the reconstructed R channel data.

As a result, narrow band image data (hereinafter, referred to as narrow band image data) in which the wavelength spectrum of each channel is narrow as illustrated in FIGS. 8 to 10 is generated. The narrow band image data may be output to the outside of the information processing unit 50 as an output signal.

2.4 Channel Data Reconstruction

Next, the reconstruction of the channel data will be described.

Here, when original image data (reconstructed channel data) desired to be restored is represented by a vector x ($\in R^N$), a vector y ($\in R^M$) of the image data (raw data) for each channel read from the pixel array unit 101 can be represented by the following Expression (1).

$$y = \Phi x + e \quad (1)$$

Note that, in Expression (1), N and M are the number of dimensions, N is the number of pixels of the original image data to be restored, and M is the number of pixels 10 of the pixel array unit 101. Therefore, $R^N$ represents an N-dimensional real number, and $R^M$ represents an M-dimensional real number.

Furthermore, $\phi (\in R^{M \times N})$ is a modulation matrix (also referred to as a system matrix), and e indicates noise observed in the imaging device.

The modulation matrix $\phi$ is, for example, a matrix calibrated and determined based on the coded mask 103.

Here, assuming that the modulation matrix $\phi$ is determined according to the G channel, the system expression in the G channel is expressed by the following Expression (2).

$$y_G = \Phi x_G + e \quad (2)$$

In Expression (2), $y_G$ represents G channel data (raw data), and $x_G$ represents reconstructed G channel data.

On the other hand, the system expression of the B channel and the system expression of the R channel are expressed by the following Expressions (3) and (4), respectively.

$$y_B = \text{not}(\Phi) x_B + e \quad (3)$$

$$y_R = \text{not}(\Phi) x_R + e \quad (4)$$

In Expressions (3) and (4), "not ( )" indicates a bitwise complement matrix (hereinafter, referred to as a bit complement matrix) as exemplified in the following Expression (5). Note that, in Expression (5), the right side indicates, for example, an example of the modulation matrix $\phi$.

$$\text{not} \begin{pmatrix} 1 & 0 & 1 & 0 & 1 \\ 1 & 1 & 1 & 0 & 0 \\ 0 & 0 & 1 & 0 & 1 \\ 1 & 1 & 0 & 0 & 1 \\ 0 & 0 & 0 & 1 & 1 \end{pmatrix} = \begin{pmatrix} 0 & 1 & 0 & 1 & 0 \\ 0 & 0 & 0 & 1 & 1 \\ 1 & 1 & 0 & 1 & 0 \\ 0 & 0 & 1 & 1 & 0 \\ 1 & 1 & 1 & 0 & 1 \end{pmatrix} \quad (5)$$

As can be seen from Expression (5), in the bit complement matrix not ($\phi$), the value is '0' in the phase having a value of '1' on the modulation matrix $\phi$, and conversely, the value is '1' in the phase having a value of '0' on the modulation matrix $\phi$.

This means that the transmission and the light shielding are inverted in the B channel and the R channel with respect to the G channel.

As described above, by substituting the image data (B channel data, G channel data, R channel data) for each channel read from the pixel array unit 101 into Expressions (2) to (4) and executing the binary matrix operation process, original image data (reconstructed B channel data, reconstructed G channel data, reconstructed R channel data) desired to be restored can be reconstructed. Then, by integrating the reconstructed channel data, original image data (output signal) desired to be restored is generated.

2.5 Overall Configuration Example of Imaging Device

The information processing unit according to the first embodiment may be configured to be incorporated in a signal processing unit (digital signal processor: DSP) incorporated in a solid-state imaging device on which the pixel array unit 101 is mounted, an image processing processor (image signal processor: ISP), inside the imaging device, connected to a solid-state imaging device 61, a server (including a cloud server or the like) connected to the imaging device via a predetermined network, or the like.

Figure 12:
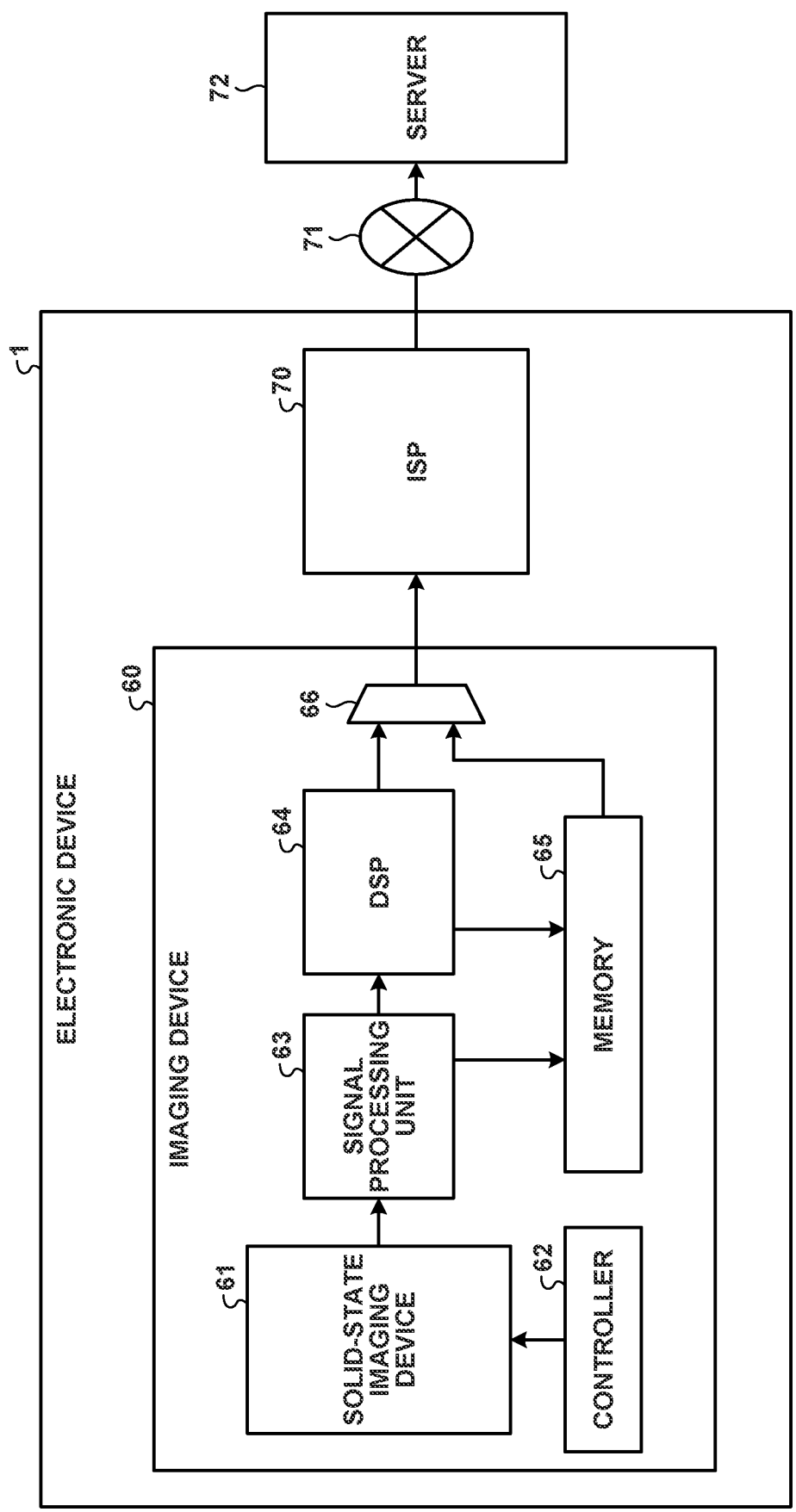
FIG. 12 is a block diagram illustrating a schematic configuration example of an information processing system including an electronic device according to the first embodiment.

FIG. 12 is a block diagram illustrating a schematic configuration example of an information processing system including an electronic device according to the first embodiment. As illustrated in FIG. 12, an electronic device 1 includes an imaging device 60 and an image processing processor (ISP) 70. The imaging device 60 includes a solid-state imaging device (also referred to as a light receiving unit) 61, a controller 62, a signal processing unit 63, a digital signal processor (DSP) 64, a memory 65, and an output unit 66.

The controller 62 controls each unit in the imaging device 60 according to, for example, a user operation or a set operation mode.

The solid-state imaging device 61 includes, for example, the pixel array unit 101, the color filter array 102, and the coded mask 103 to output image data (raw data) generated by reading a pixel signal from each pixel 10 of the pixel array unit 101. The light incident from the outside is imaged on a light incident face on which the pixels 10 are arranged in the solid-state imaging device 61. Each pixel 10 of the solid-state imaging device 61 electrically converts light incident on the light receiving element, thereby readably accumulating the electric charge corresponding to the amount of incident light. Then, the solid-state imaging device 61 outputs a pixel signal based on the electric charge accumulated in each pixel 10 as frame-by-frame image data.

The signal processing unit 63 executes various types of signal processes on the image data (raw data) read from the solid-state imaging device 61. For example, the signal processing unit 63 may convert the image data into a YUV format, an RGB format, or the like. Furthermore, for example, the signal processing unit 63 may execute processing such as noise removal and white balance adjustment on the image data as necessary.

Note that, in the present embodiment, the signal processing unit 63 is not an essential component, and may be omitted. In this case, the image data (raw data) output from the solid-state imaging device 61 may be directly input to the DSP 64 or the memory 65, or may be output to the external image processing processor (ISP) 70 or the like via the output unit 66 without passing through the DSP 64.

The DSP 64 may execute various types of signal processes on the input image data, for example.

Furthermore, the DSP 64 outputs a result (hereinafter, referred to as a signal process result) obtained by the signal process on the image data to the memory 65 and/or the output unit 66. Note that a memory controller that controls access to the memory 65 may be incorporated in the DSP 64.

In the present embodiment, the DSP 64 is not an essential component and may be omitted. Alternatively, the DSP 64 may output the input image data as it is without executing any signal process on the input image data. In these cases, the image data output from the solid-state imaging device 61 or the signal processing unit 63 may be input to the memory 65, or may be output to the external image processing processor (ISP) 70 or the like via the output unit 66.

The memory 65 may store the signal process result obtained by the DSP 64 as necessary.

The output unit 66 selectively outputs the image data or the signal process result output from the solid-state imaging device 61, the signal processing unit 63, or the DSP 64, or the image data or the signal process result stored in the memory 65 to the outside, for example, in accordance with a selection control signal from the controller 62.

The image data or the signal process result output from the output unit 66 as described above is input to the image processing processor (ISP) 70 that processes a display, a user interface, and the like. The image processing processor (ISP) 70 is configured using, for example, a central processing unit (CPU) or the like, and executes an operating system, various types of application software, and the like. The image processing processor (ISP) 70 may have functions such as a graphics processing unit (GPU) and a baseband processor. The image processing processor (ISP) 70 executes various processes as necessary on the input image data or signal process result, executes display to the user, or transmits the image data or signal process result to an external server (including a cloud server or the like) 72 via a predetermined network 71.

Note that, as the predetermined network 71, for example, various networks such as the Internet, a wired local area network (LAN), a wireless LAN, a mobile communication network, and Bluetooth (registered trademark) can be applied. Furthermore, the transmission destination of the image data or the signal process result is not limited to the server 72, and may be various information processing devices (systems) having a communication function, such as a server that operates in cooperation as a single server or a plurality of servers, a file server that stores various pieces of data, and a communication terminal such as a cellular phone.

In the above configuration, the information processing unit 50 described above may be incorporated in the signal processing unit 63, may be incorporated in the DSP 64, may be incorporated in the image processing processor (ISP) 70, or may be incorporated in the server 72.

Note that, in FIG. 12, the solid-state imaging device 61, the controller 62, the signal processing unit 63, the DSP 64, the memory 65, and the output unit 66 are separately described, but two or more or all of them may be built in a single chip or a single multilayer chip.

2.6 Action/Effect

As described above, in the present embodiment, the imaging optical system of the imaging device 60 has a configuration in which the coded mask 103 and the color filter array 102 are combined. As a result, the wavelength spectrum of the light incident on the pixel 10 associated with each of the color filters 21R, 21G, and 21B can be basically a wavelength spectrum expressed by the convolution operation of the wavelength transmission characteristics 22R, 22G, or 22B of the color filters 21R, 21G, or 21B, respectively, and the wavelength transmission characteristics 32R, 32G, and 32B of the first filter 31A and the second filter 31B of the coded mask 103.

Therefore, the wavelength transmission characteristics 32R, 32G, and 32B realized by the first filter 31A and the second filter 31B of the coded mask 103 are narrower than the wavelength transmission characteristics 22R, 22G, and 22B of the color filters 21R, 21G, and 21B, so that the wavelength band of the light to be detected can be narrowed.

In addition, since the wavelength transmission characteristics 32R, 32G, and 32B realized by the first filter 31A and the second filter 31B of the coded mask 103 can be easily changed by changing the pitch, size, and the like of the first filter 31A and the second filter 31B, the wavelength band of the light to be detected can be easily and flexibly changed to a desired band by changing the pitch, size, and the like of the first filter 31A and the second filter 31B.

That is, according to the present embodiment, it is possible to flexibly change the optical wavelength band to be detected.

Furthermore, according to the present embodiment, the imaging system without a lens can realize downsizing, weight reduction, cost reduction, non-planarization of the imaging device 60, control of the depth of field, wide viewing angle, and the like.

Note that, in the first embodiment, the case where the color filter array 102 is disposed between the pixel array unit 101 and the coded mask 103 has been exemplified, but the present invention is not limited to such a configuration, and the coded mask 103 may be disposed between the pixel array unit 101 and the color filter array 102.

3. Second Embodiment

Next, an imaging device, an electronic device, an information processing method, and a program according to the second embodiment will be described in detail with reference to the drawings.

The imaging device, the electronic device, the information processing method, and the program exemplified in the first embodiment can be applied to, for example, a lensless imaging system for narrow band image observation that has been put into practical use in the medical field, particularly, endoscopic observation. By applying the first embodiment to the lensless imaging system for narrow band image observation, imaging at a wide viewing angle at an arbitrary depth of field can be realized at low cost by the extremely small and thin imaging device 60.

On the other hand, the imaging device, the electronic device, the information processing method, and the program according to the first embodiment are not limited to the medical field, and can exhibit various effects in various fields by designing the wavelength transmission characteristics of the coded mask 103.

For example, it is also possible to generate image data including narrow band color components of two colors of red (R) and green (G) in the RGB band while achieving the effects described in the first embodiment.

Therefore, in the second embodiment, a case of generating image data including narrow band color components of two colors will be described with an example. Note that, in the following description, a case where image data is generated with narrow band color components of two colors of red (R) and near-infrared (IR), and a blue (B) color filter (corresponding to the color filter 21B) is used to generate image data (IR channel data) of a narrow band color component of near-infrared (IR) will be described with an example.

In the following description, the same configurations and operations as those of the first embodiment are cited, and redundant description thereof will be omitted.

3.1 Schematic Configuration Example of Imaging Optical System

Figure 13:
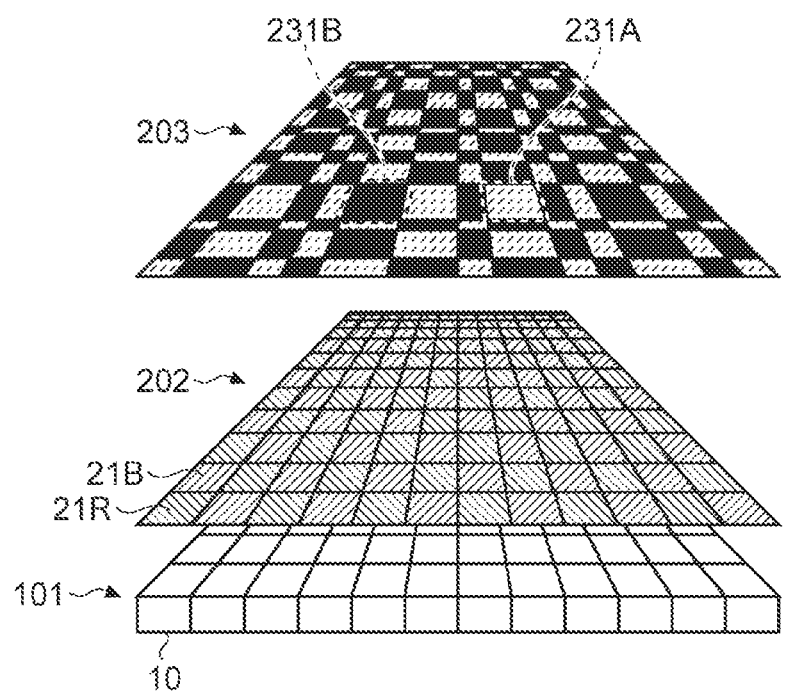
FIG. 13 is a schematic diagram illustrating a schematic configuration example of an imaging optical system according to the second embodiment.
Figure 14:
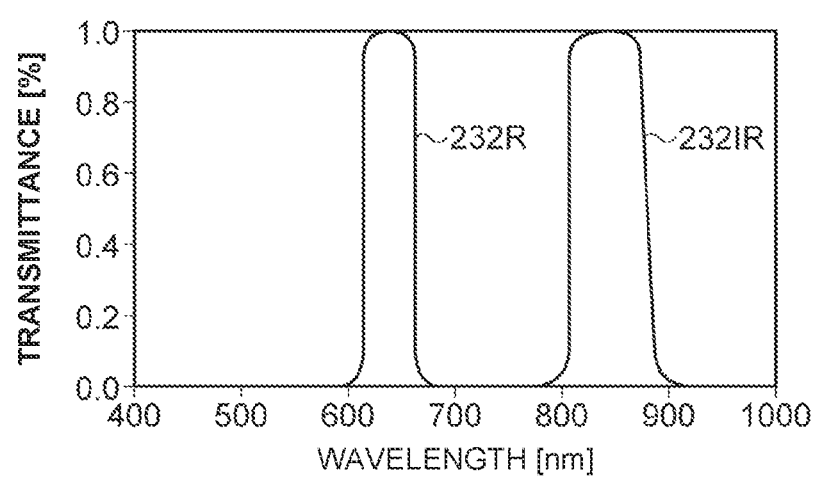
FIG. 14 is a diagram illustrating wavelength transmission characteristics of a first filter in a coded mask according to a second embodiment.

FIG. 13 is a schematic diagram illustrating a schematic configuration example of an imaging optical system according to the second embodiment. FIG. 14 is a diagram illustrating wavelength transmission characteristics of a first filter in a coded mask according to the first embodiment.

As illustrated in FIG. 13, the imaging optical system according to the present embodiment has a configuration in which a color filter array 202 and a coded mask 203 are disposed on a light incident face of the pixel array unit 101. The pixel array unit 101 may be similar to that described in the first embodiment.

Here, as can be seen with reference to FIG. 2 described in the first embodiment, the color filters 21R, 21G, and 21B have close wavelength transmission characteristics 22R, 22G, and 22B in a near-infrared wavelength band (for example, in the vicinity of 850 nm).

Therefore, in the present embodiment, the color filter 21B for selectively transmitting blue (B) light is used as a color filter for selectively transmitting near-infrared light. Since the color filter 21B has a higher light shielding property against red (R) light, which is another color component used for generating image data, than the color filter 21G for selectively transmitting green (G) light, it is possible to generate clearer image data by using the color filter 21B for near-infrared light.

Therefore, the color filter array 202 according to the present embodiment has, for example, a configuration in which the color filters 21R and 21B according to the first embodiment are alternately arranged in the row direction and the column direction. The wavelength transmission characteristics of the color filter 21R may also be similar to the wavelength transmission characteristics 22R described with reference to FIG. 2 in the first embodiment, for example.

Similarly to the coded mask 103 according to the first embodiment, the coded mask 203 has a structure in which first filters 231A and second filters 231B having different sizes are arranged in a grating pattern.

For example, as illustrated in FIG. 14, the first filter 231A may be a band pass filter including wavelength selection characteristics 232R in which light in a narrow band (for example, in the vicinity of 630 nm) corresponding to red is selectively transmitted and wavelength selection characteristics 232IR in which light (IR) in a narrow band (for example, in the vicinity of 850 nm) corresponding to near-infrared light is selectively transmitted.

Note that the wavelength transmission characteristics of the second filter 231B may be similar to the wavelength transmission characteristics 932B of the light-shielding portion 931B described as the comparative example in the first embodiment. That is, in the second embodiment, the second filter 231B may be a light-shielding portion.

As described above, in a case where image data is generated with narrow band color components of two colors of red (R) and near-infrared (IR), the color filters 21R and 21B used in the color filter array 102 of the Bayer array can be used for the color filter array 202. Therefore, the color filter array 202 can be realized by a simpler design change.

3.2 Synthesis Wavelength Transmission Characteristics

Figure 15:
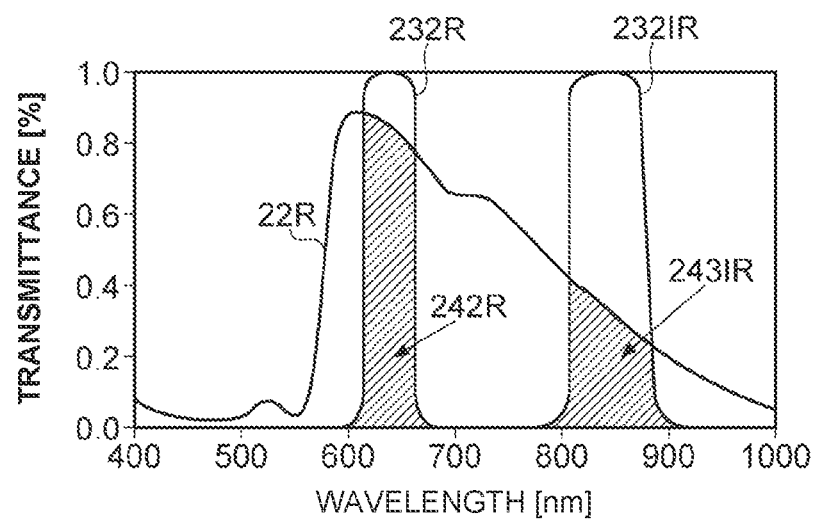
FIG. 15 is a diagram (part 1) illustrating a wavelength spectrum of light transmitted through each color filter in a case where the coded mask and the color filter according to the second embodiment are combined.
Figure 16:
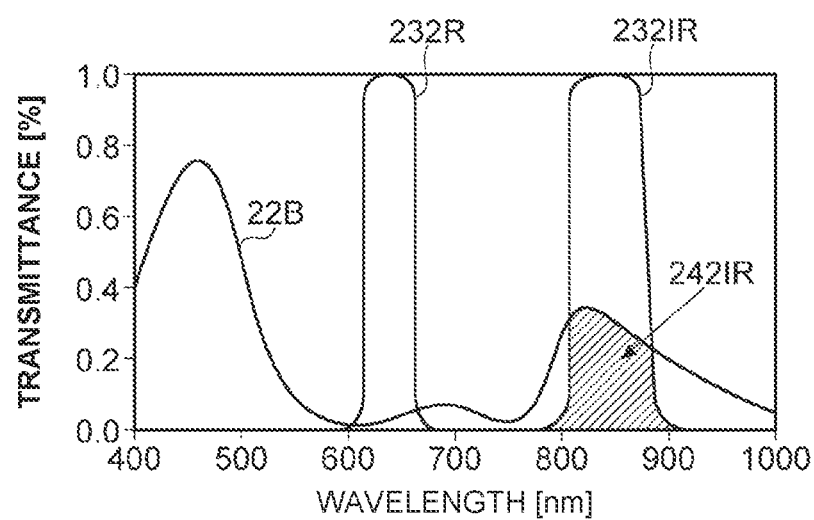
FIG. 16 is a diagram (part 2) illustrating a wavelength spectrum of light transmitted through each color filter in a case where the coded mask and the color filter according to the second embodiment are combined.

FIGS. 15 and 16 are diagrams illustrating a wavelength spectrum of light transmitted through each color filter in a case where the coded mask and the color filter according to the second embodiment are combined. Note that FIG. 15 illustrates an example of a wavelength spectrum of light transmitted through the color filter 21R, and FIG. 16 illustrates an example of a wavelength spectrum of light transmitted through the color filter 21B.

Here, as described above, the color filter 21R has the wavelength transmission characteristics 22R in which a certain amount of light is transmitted even at near-infrared light (for example, light around 850 nm). Therefore, as illustrated in FIG. 15, the light transmitted through the color filter 21R includes not only light 242R of the red (R) component transmitted through the first filter 231A but also light 2431R of the near-infrared (IR) component transmitted through the first filter 231A.

This indicates that the pixel 10 corresponding to the color filter 21R cannot accurately detect the light amount of the light 242R of the red (R) component.

On the other hand, as described above, in the near-infrared wavelength band (for example, in the vicinity of 850 nm), the color filter 21R and the color filter 21B have substantially the same wavelength transmission characteristics (see FIG. 16). Therefore, as illustrated in FIGS. 15 and 16, when light of the same light amount enters the color filter 21R and the color filter 21B, the light amount of the near-infrared light 2431R among the light (242R+243IR) transmitted through the color filter 21R is substantially equal to the light amount of the near-infrared light 242IR transmitted through the color filter 21B.

This indicates that the light amount of the light 242R of the red (R) component among the light transmitted through the color filter 21R can be obtained by subtracting the light amount (similarly, the amount of electric charge generated by photoelectric conversion) of the light 242IR transmitted through the color filter 21B from the light amount (actually, the amount of electric charge generated by photoelectric conversion) of the light (242R+243IR) transmitted through the color filter 21R.

However, the wavelength transmission characteristics of the color filter 21R and the wavelength transmission characteristics of the color filter 21B with respect to the near-infrared wavelength band (for example, in the vicinity of 850 nm) do not completely match.

Therefore, in the present embodiment, from the ratio between the wavelength transmission characteristics of the color filter 21R (corresponding to the area of the region of the light 2431R in FIG. 15) and the wavelength transmission characteristics of the color filter 21B (corresponding to the area of the region of the light 242IR in FIG. 16) with respect to the near-infrared wavelength band (for example, in the vicinity of 850 nm), a weight coefficient for making the amount of near-infrared light 2431R included in the light transmitted through the color filter 21R (242R+243IR) and the amount of near-infrared light 242IR passing through the color filter 21B substantially equal is calculated, and the amount of red light 242R in the light transmitted through the color filter 21R (242R+243IR) is obtained using the weight coefficient.

3.3 Schematic Configuration Example of Information Processing Unit

Figure 17:
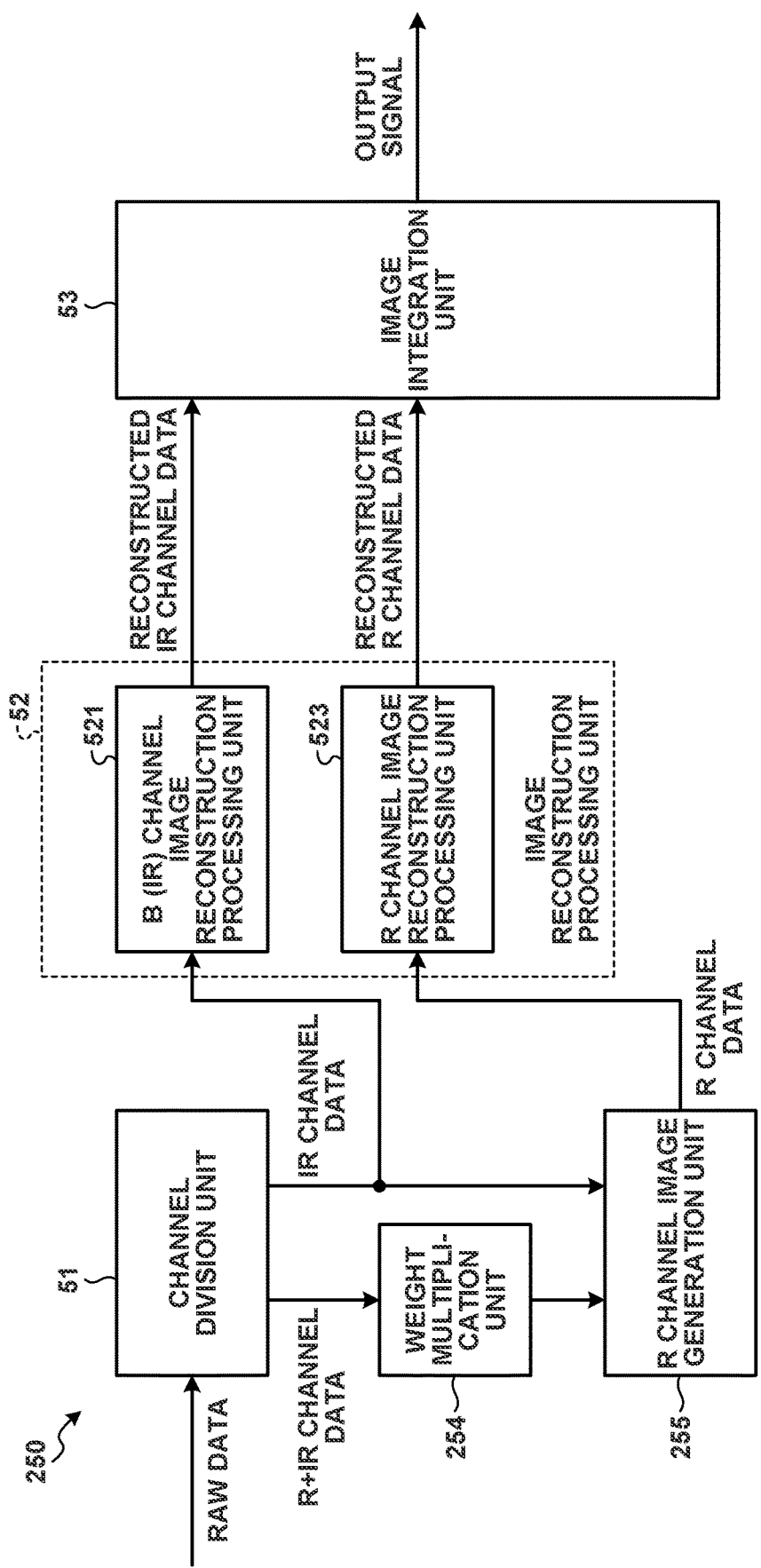
FIG. 17 is a block diagram illustrating a schematic configuration example of an information processing unit according to the second embodiment.

FIG. 17 is a block diagram illustrating a schematic configuration example of an information processing unit according to the second embodiment. As illustrated in FIG. 17, an information processing unit 250 has a configuration in which a weight multiplication unit (also referred to as a weighting unit) 254 and an R channel image generation unit (also referred to as a subtraction unit) 255 are added and a G channel image reconstruction processing unit 522 in the image reconstruction processing unit 52 is omitted in a configuration similar to the configuration described with reference to FIG. 11 in the first embodiment. Furthermore, in the second embodiment, a B channel image reconstruction processing unit 521 according to the first embodiment functions as a B (IR) channel image reconstruction processing unit 521 that reconstructs IR channel data.

Similarly to the first embodiment, for example, the channel division unit 51 generates image data (R+IR channel data and IR channel data) for each channel from the image data (raw data) read from the pixel array unit 101, and inputs the generated image data to the image reconstruction processing unit 52. Note that the R+IR channel data may be image data read from the pixel 10 associated with the color filter 21R, and the IR channel data may be image data read from the pixel 10 associated with the color filter 21B.

Similarly to the first embodiment, image data read from all the pixels 10 of the pixel array unit 101 may be input as raw data to the channel division unit 51, or R+IR channel data and IR channel data read by skipping the pixels 10 of the pixel array unit 101 for each channel may be input as raw data to it. In a case where the image data read from all the pixels 10 of the pixel array unit 101 is input as raw data, the channel division unit 51 may generate image data (R+IR channel data and IR channel data) for each channel by demosaicing the input image data.

The R+IR channel data generated by the channel division unit 51 is input to the weight multiplication unit 254, and the IR channel data is input to the B (IR) channel image reconstruction processing unit 521 of the image reconstruction processing unit 52 and is input to the R channel image generation unit 255.

For example, the weight multiplication unit 254 multiplies each pixel value of the R+IR channel data by a preset weight coefficient W, and inputs the R+IR channel data subjected to light amount adjustment (pixel value adjustment) to the R channel image generation unit 255.

The R channel image generation unit 255 generates R channel data by subtracting the pixel value of each pixel of the IR channel data from the pixel value of each pixel of the R+IR channel data subjected to the pixel value adjustment. Note that this subtraction process may be executed between pixels corresponding to each other in the R+IR channel data and the IR channel data.

The R channel data generated in this manner is input to the R channel image reconstruction processing unit 523 in the image reconstruction processing unit 52.

Similarly to the first embodiment, the B (IR) channel image reconstruction processing unit 521 and the R channel image reconstruction processing unit 523 reconstruct the input IR channel data and R channel data to generate original image data (reconstructed IR channel data and reconstructed R channel data), and input the generated reconstructed IR channel data and reconstructed R channel data to the image integration unit 53.

Then, similarly to the first embodiment, the image integration unit 53 restores original image data by integrating the reconstructed IR channel data and the reconstructed R channel data.

3.4 Weight Coefficient

Figure 18:
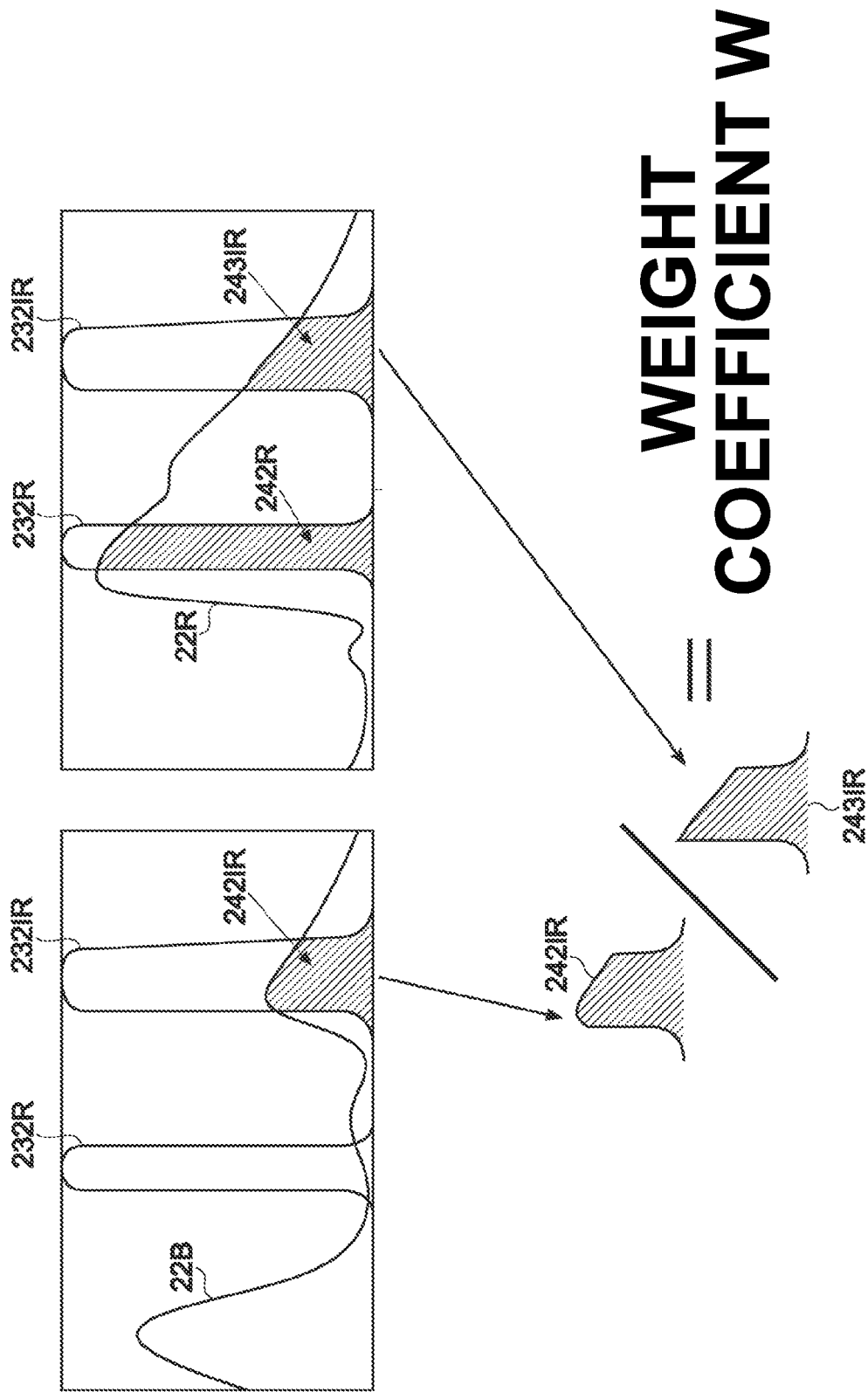
FIG. 18 is a diagram for explaining calculation of a weight coefficient according to the second embodiment.

Here, a weight coefficient for obtaining appropriate R channel data will be described. FIG. 18 is a diagram for describing calculation of a weight coefficient according to the second embodiment. As illustrated in FIG. 18, for the weight coefficient W, in order to obtain R channel data according to the light amount of the red light 242R from the R+IR channel data read from the pixel (hereinafter, referred to as an R pixel) 10 with which the color filter 21R is associated, it is necessary to cancel the wavelength transmission characteristics of the color filter 21R with respect to near-infrared light (for example, light around 850 nm), which is a disturbance for the R pixel 10, using the wavelength transmission characteristics of the color filter 21B with respect to near-infrared light (for example, light around 850 nm).

Therefore, in the present embodiment, as described above, the ratio between the integral values of the wavelength transmission characteristics with respect to each piece of near-infrared light (for example, light around 850 nm) of the color filters 21R and 21B, that is, the wavelength transmission characteristics around 850 nm (for example, a wavelength band of about 780 to 900 nm) illustrated in FIG. 18 is obtained as the weight coefficient W, and the pixel value of each pixel of the R+IR channel data is multiplied by the obtained weight coefficient W. As a result, it is possible to obtain appropriate R channel data by subtracting IR channel data read from the pixel (hereinafter, referred to as a B pixel) 10 associated with the color filter 21B from the R+IR channel data after the pixel value adjustment.

Note that, here, the case of multiplying the R+IR channel data by the weight coefficient W has been exemplified, but the present invention is not limited thereto. For example, it is also possible to obtain appropriate R channel data by a method of dividing IR channel data read from the B pixel 10 by the weight coefficient W. Alternatively, it is also possible to obtain appropriate R channel data by normalizing the R+IR channel data and the IR channel data and then subtracting the IR channel data from the R+IR channel data.

Note that, since there is usually a sensitivity difference in each band of the finally obtained image data (output signal), it is common to perform normalization by multiplying each band by a coefficient assuming a sensitivity ratio of white (white balance adjustment). In this case, in the second embodiment, it is preferable to consider the weight coefficient calculated as described above in the white balance adjustment.

3.5 Action/Effect

As described above, according to the present embodiment, even in a case where different types of color filters transmit light of wavelength bands overlapping each other, it is possible to acquire channel data of light of a target wavelength band using the weight coefficient W calculated based on the degree of the overlap. This makes it possible to restore accurate image data (output data).

Other configurations, operations, and effects may be similar to those of the above-described embodiment, and thus detailed description thereof is omitted here.

Note that, in the above-described embodiment, for the sake of clarity, the case where the weighting calculation (corresponding to the process executed by the weight multiplication unit 254 and the R channel image generation unit 255) is executed after separating the raw data read from the pixel array unit 101 for each channel has been exemplified, but the process is simple. That is, weighting subtraction between channels can be performed in peripheral pixels.

However, in a practical implementation, the pixel value of each pixel in the R+IR channel data is corrected by weighting calculation using the pixel value of the pixel around the corresponding pixel in the IR channel data without changing the raw data, so that it is possible to further simplify the process.

In addition, the second embodiment can be suitably provided to an application, for example, that quantifies a vegetation index in the agricultural field and a relative value between two narrow band colors used for inspection of freshness and sugar content in the food inspection field. In this case, it is possible to realize inspection and measurement at a very close distance to the subject or at a wide viewing angle at low cost by the imaging device 60 that is extremely downsized and thinned.

Furthermore, although the case where the color filter array 202 on each pixel 10 is configured using the color filters 21R and 21B has been exemplified, the spatial resolution can be enhanced by such a configuration. However, the present invention is not limited to such a configuration. That is, a similar effect can be obtained by using a color filter array of the Bayer array or a color filter array of another color filter array instead of the color filter array 202.

4. Example of Application to Endoscopic Surgery System

The technology according to the present disclosure (the present technology) can be applied to various products. For example, the technology according to the present disclosure may be applied to an endoscopic surgery system.

Figure 19:
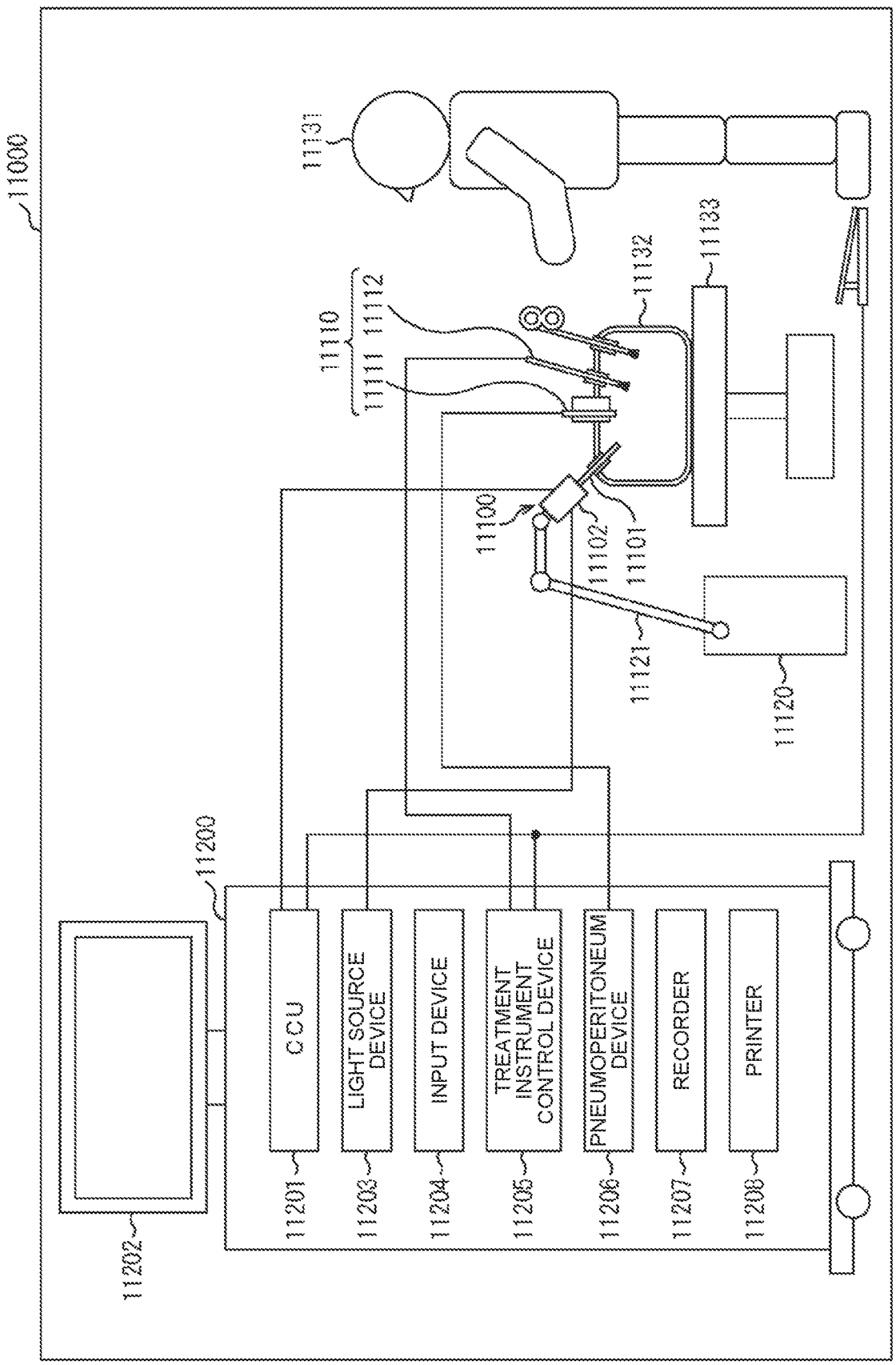
FIG. 19 is a diagram illustrating an example of a schematic configuration of an endoscopic surgery system.

FIG. 19 is a diagram illustrating an example of a schematic configuration of an endoscopic surgery system to which the technology according to the present disclosure (the present technology) can be applied.

FIG. 19 illustrates a state in which an operator (doctor) 11131 is performing surgery on a patient 11132 on a patient bed 11133 using an endoscopic surgery system 11000. As illustrated, the endoscopic surgery system 11000 includes an endoscope 11100, other surgical tools 11110 such as a pneumoperitoneum tube 11111 and an energy treatment instrument 11112, a support arm device 11120 that supports the endoscope 11100, and a cart 11200 on which various devices for endoscopic surgery are mounted.

The endoscope 11100 includes a lens barrel 11101 whose region of a predetermined length from the distal end is inserted into the body cavity of the patient 11132, and a camera head 11102 connected to the proximal end of the lens barrel 11101. In the illustrated example, the endoscope 11100 configured as a so-called rigid scope having the rigid lens barrel 11101 is illustrated, but the endoscope 11100 may be configured as a so-called flexible scope having a flexible lens barrel.

An opening portion into which an objective lens is fitted is provided at the distal end of the lens barrel 11101. A light source device 11203 is connected to the endoscope 11100, and light generated by the light source device 11203 is guided to the distal end of the lens barrel by a light guide extending inside the lens barrel 11101, and is emitted toward an observation target in the body cavity of the patient 11132 via the objective lens. Note that the endoscope 11100 may be a forward-viewing endoscope, an oblique-viewing endoscope, or a side-viewing endoscope.

An optical system and an imaging element are provided inside the camera head 11102, and reflected light (observation light) from the observation target is condensed on the imaging element by the optical system. The observation light is photoelectrically converted by the imaging element, and an electrical signal corresponding to the observation light, that is, an image signal corresponding to the observation image is generated. The image signal is transmitted to a camera control unit (CCU) 11201 as RAW data.

The CCU 11201 includes a central processing unit (CPU), a graphics processing unit (GPU), and the like, and integrally controls operation of the endoscope 11100 and a display device 11202. Furthermore, the CCU 11201 receives an image signal from the camera head 11102, and performs various types of image processes for displaying an image based on the image signal, such as development processing (demosaic processing), on the image signal.

The display device 11202 displays an image based on the image signal subjected to the image process by the CCU 11201 under the control of the CCU 11201.

The light source device 11203 includes a light source such as a light emitting diode (LED), for example, and supplies irradiation light for photographing a surgical site or the like to the endoscope 11100.

An input device 11204 is an input interface for the endoscopic surgery system 11000. The user can input various types of information and instructions to the endoscopic surgery system 11000 via the input device 11204. For example, the user inputs an instruction or the like to change imaging conditions (type, magnification, focal distance, and the like of irradiation light) by the endoscope 11100.

A treatment instrument control device 11205 controls actuation of the energy treatment instrument 11112 for cauterization and incision of tissue, sealing of a blood vessel, or the like. A pneumoperitoneum device 11206 feeds gas into the body cavity of the patient 11132 via the pneumoperitoneum tube 11111 in order to inflate the body cavity for the purpose of securing a visual field by the endoscope 11100 and securing a working space for the operator. A recorder 11207 is a device capable of recording various types of information about surgery. A printer 11208 is a device capable of printing various types of information about surgery in various formats such as text, image, or graph.

Note that the light source device 11203 that supplies the endoscope 11100 with the irradiation light at the time of photographing the surgical site can include, for example, an LED, a laser light source, or a white light source including a combination thereof. In a case where the white light source includes a combination of RGB laser light sources, since the output intensity and the output timing of each color (each wavelength) can be controlled with high accuracy, adjustment of the white balance of the captured image can be performed in the light source device 11203. Furthermore, in this case, by irradiating the observation target with the laser light from the RGB laser light source in a time division manner and controlling the actuation of the imaging element of the camera head 11102 in synchronization with the irradiation timing, it is also possible to capture an image corresponding to the RGB in a time division manner. According to this method, a color image can be obtained without providing a color filter in the imaging element.

Furthermore, the actuation of the light source device 11203 may be controlled so as to change the intensity of light to be output every predetermined time. By controlling the actuation of the imaging element of the camera head 11102 in synchronization with the timing of the change in intensity of the light to acquire images in a time division manner and synthesizing the images, it is possible to generate an image of a high dynamic range without so-called blocked up shadows and white halation.

Furthermore, the light source device 11203 may be configured to be able to supply light in a predetermined wavelength band corresponding to special light observation. In special light observation, for example, by irradiating light in a narrower band than irradiation light (that is, white light) at the time of normal observation utilizing wavelength dependency of light absorption in a body tissue, so-called narrow band imaging in which a predetermined tissue such as a blood vessel in a mucosal surface layer is photographed with high contrast is performed. Alternatively, in the special light observation, fluorescence observation for obtaining an image by fluorescence generated by irradiation with excitation light may be performed. In the fluorescence observation, it is possible to irradiate a body tissue with excitation light to observe fluorescence from the body tissue (autofluorescence observation), or to locally inject a reagent such as indocyanine green (ICG) into the body tissue and irradiate the body tissue with excitation light corresponding to a fluorescence wavelength of the reagent to obtain a fluorescent image, and the like. The light source device 11203 can be configured to be able to supply narrow band light and/or excitation light corresponding to such special light observation.

Figure 20:
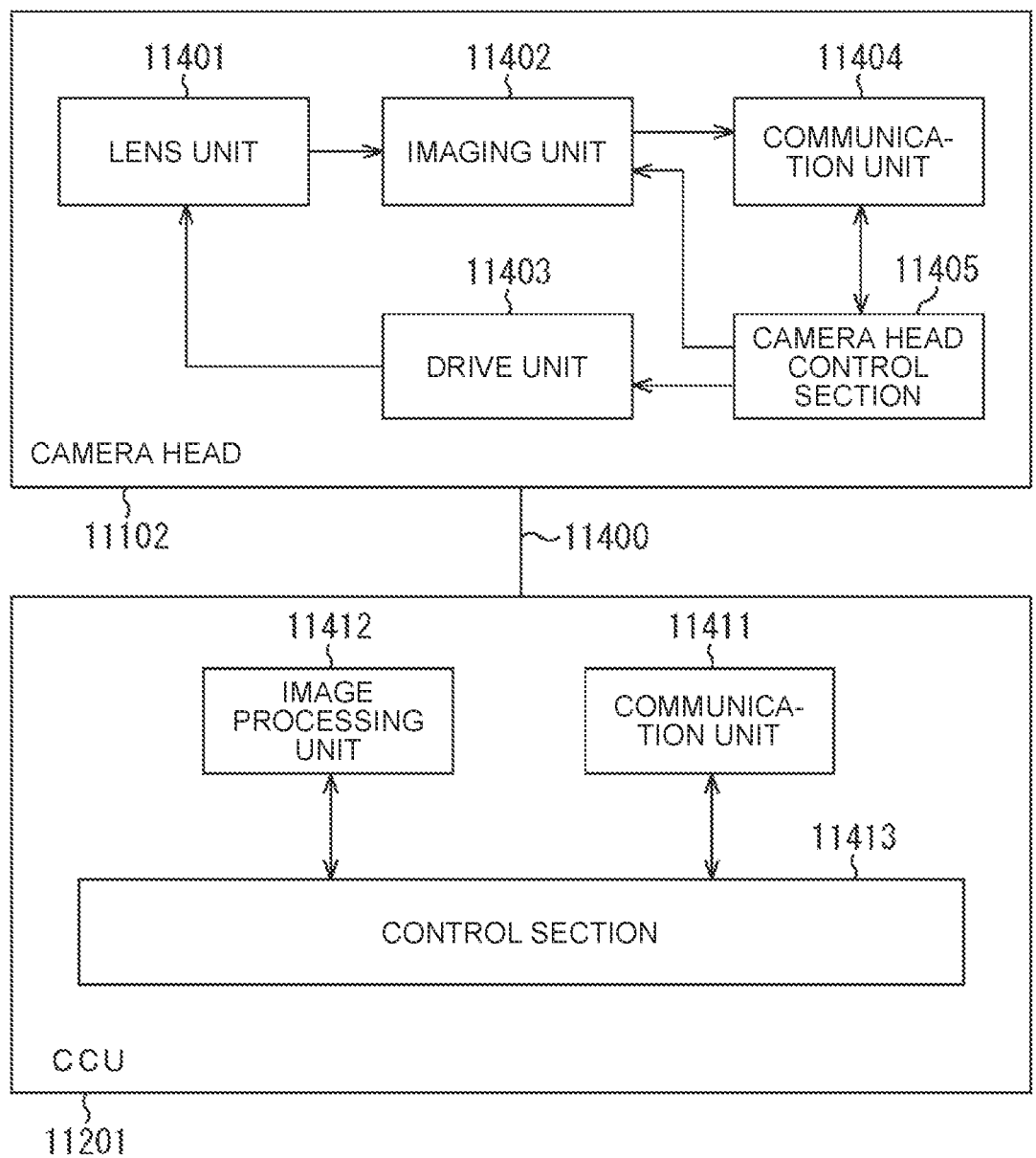
FIG. 20 is a block diagram illustrating an example of functional configurations of a camera head and a CCU.

FIG. 20 is a block diagram illustrating an example of functional configurations of the camera head 11102 and the CCU 11201 illustrated in FIG. 19.

The camera head 11102 includes a lens unit 11401, an imaging unit 11402, a drive unit 11403, a communication unit 11404, and a camera head control section 11405. The CCU 11201 includes a communication unit 11411, an image processing unit 11412, and a control section 11413. The camera head 11102 and the CCU 11201 are communicably connected to each other by a transmission cable 11400.

The lens unit 11401 is an optical system provided at a connection portion with the lens barrel 11101. Observation light taken in from the distal end of the lens barrel 11101 is guided to the camera head 11102 and enters the lens unit 11401. The lens unit 11401 is configured by combining a plurality of lenses including a zoom lens and a focus lens.

The number of imaging elements constituting the imaging unit 11402 may be one (so-called single-plate type) or plural (so-called multi-plate type). In a case where the imaging unit 11402 is configured as a multi-plate type, for example, image signals corresponding to the RGB may be generated by the respective imaging elements, and a color image may be obtained by combining the image signals. Alternatively, the imaging unit 11402 may include a pair of imaging elements for acquiring right-eye and left-eye image signals corresponding to three-dimensional (3D) display. By performing the 3D display, the operator 11131 can more accurately grasp the depth of the living tissue in the surgical site. Note that, in a case where the imaging unit 11402 is configured as a multi-plate type, a plurality of lens units 11401 can be provided corresponding to the respective imaging elements.

Furthermore, the imaging unit 11402 is not necessarily provided in the camera head 11102. For example, the imaging unit 11402 may be provided immediately after the objective lens inside the lens barrel 11101.

The drive unit 11403 includes an actuator, and moves the zoom lens and the focus lens of the lens unit 11401 by a predetermined distance along the optical axis under the control of the camera head control section 11405. As a result, the magnification and focus of the image captured by the imaging unit 11402 can be appropriately adjusted.

The communication unit 11404 includes a communication device that transmits and receives various types of information to and from the CCU 11201. The communication unit 11404 transmits the image signal obtained from the imaging unit 11402 as RAW data to the CCU 11201 via the transmission cable 11400.

Furthermore, the communication unit 11404 receives a control signal for controlling driving of the camera head 11102 from the CCU 11201, and supplies the control signal to the camera head control section 11405. The control signal includes, for example, information about imaging conditions such as information for designating a frame rate of a captured image, information for designating an exposure value at the time of imaging, and/or information for designating a magnification and a focus of the captured image.

Note that the imaging conditions such as the frame rate, the exposure value, the magnification, and the focus may be appropriately designated by the user, or may be automatically set by the control section 11413 of the CCU 11201 based on the acquired image signal. In the latter case, a so-called auto exposure (AE) function, an auto focus (AF) function, and an auto white balance (AWB) function are installed in the endoscope 11100.

The camera head control section 11405 controls driving of the camera head 11102 based on the control signal from the CCU 11201 received via the communication unit 11404.

The communication unit 11411 includes a communication device that transmits and receives various types of information to and from the camera head 11102. The communication unit 11411 receives an image signal transmitted from the camera head 11102 via the transmission cable 11400.

Furthermore, the communication unit 11411 transmits a control signal for controlling driving of the camera head 11102 to the camera head 11102. The image signal and the control signal can be transmitted by electric communication, optical communication, or the like.

The image processing unit 11412 performs various types of image processes on the image signal that is RAW data transmitted from the camera head 11102.

The control section 11413 performs various types of control related to imaging of a surgical site or the like by the endoscope 11100, and display of a captured image obtained by imaging of the surgical site or the like. For example, the control section 11413 generates a control signal for controlling driving of the camera head 11102.

Furthermore, the control section 11413 causes the display device 11202 to display a captured image of a surgical site or the like based on the image signal subjected to the image process by the image processing unit 11412. At this time, the control section 11413 may recognize various objects in the captured image using various image recognition technologies. For example, the control section 11413 can recognize a surgical tool such as forceps, a specific body part, bleeding, mist at the time of using the energy treatment instrument 11112, and the like by detecting the shape, color, and the like of the edge of the object included in the captured image. When displaying the captured image on the display device 11202, the control section 11413 may superimpose and display various types of surgery support information on the image of the surgical site using the recognition result. Since the surgery support information is superimposed and displayed, and presented to the operator 11131, the burden on the operator 11131 can be reduced and the operator 11131 can reliably proceed with the surgery.

The transmission cable 11400 connecting the camera head 11102 and the CCU 11201 is an electrical signal cable compatible with electrical signal communication, an optical fiber compatible with optical communication, or a composite cable thereof.

Here, in the illustrated example, communication is performed by wire using the transmission cable 11400, but communication between the camera head 11102 and the CCU 11201 may be performed wirelessly.

An example of the endoscopic surgery system to which the technique according to the present disclosure can be applied is described above. The technique according to the present disclosure can be applied to, for example, the imaging unit 11402 of the camera head 11102 of the configuration described above.

Note that, here, the endoscopic surgery system is described as an example, but the technology according to the present disclosure may be applied to, for example, a microscopic surgery system or the like.

5. Example of Application to Moving Object

The technology according to the present disclosure (the present technology) can be applied to various products. For example, the technology according to the present disclosure may be further applied to a device mounted on any of various moving objects such as automobiles, electric cars, hybrid electric cars, motorcycles, bicycles, personal mobility, airplanes, drones, ships, and robots.

Figure 21:
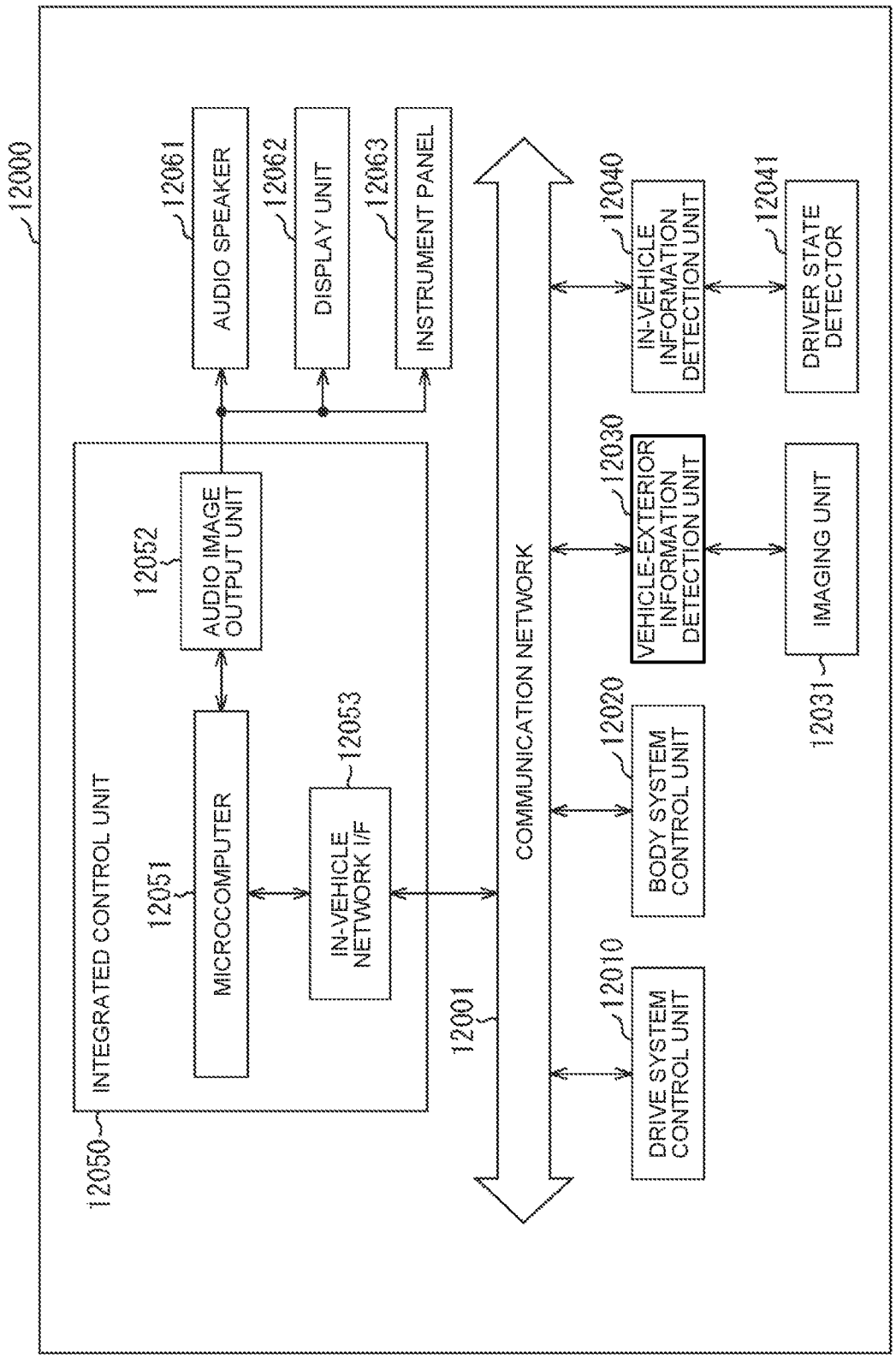
FIG. 21 is a block diagram illustrating an example of a schematic configuration of a vehicle control system.

FIG. 21 is a block diagram illustrating a schematic configuration example of a vehicle control system, which is an example of a moving object control system to which the technique according to the present disclosure can be applied.

A vehicle control system 12000 includes a plurality of electronic control units connected via a communication network 12001. In the example illustrated in FIG. 21, the vehicle control system 12000 includes a drive system control unit 12010, a body system control unit 12020, a vehicle-exterior information detection unit 12030, an in-vehicle information detection unit 12040, and an integrated control unit 12050. Further, as the functional configuration of the integrated control unit 12050, a microcomputer 12051, an audio image output unit 12052, and an in-vehicle network interface (I/F) 12053 are illustrated.

The drive system control unit 12010 controls the operation of the device related to the drive system of the vehicle according to various programs. For example, the drive system control unit 12010 serves as a driving force generation unit that generates the driving force of the vehicle such as an internal combustion engine or a driving motor, a driving force transmission mechanism that transmits the driving force to the wheels, a steering mechanism for adjusting a steering angle of the vehicle, and a control device such as a braking device that generates a braking force of the vehicle.

The body system control unit 12020 controls the operation of various devices mounted on the vehicle body according to various programs. For example, the body system control unit 12020 functions as a control device for a keyless entry system, a smart key system, a power window device, or various lamps such as a head lamp, a back lamp, a brake lamp, a blinker, and a fog lamp. In this case, the body system control unit 12020 may receive radio waves transmitted from a portable device that substitutes for the key or signals of various switches. The body system control unit 12020 receives the input of these radio waves or signals and controls a door lock device, a power window device, a lamp, and the like of the vehicle.

The vehicle-exterior information detection unit 12030 detects information outside the vehicle equipped with the vehicle control system 12000. For example, an imaging unit 12031 is connected to the vehicle-exterior information detection unit 12030. The vehicle-exterior information detection unit 12030 causes the imaging unit 12031 to capture an image of the outside of the vehicle and receives the picked up image. The vehicle-exterior information detection unit 12030 may perform the object detection process or the distance detection process of detecting a person, a vehicle, an obstacle, a sign, or characters on the road surface based on the received image.

The imaging unit 12031 is an optical sensor that receives light to output an electrical signal according to the amount of the light received. The imaging unit 12031 can output an electrical signal as an image or can output it as distance measurement information. Further, the light received by the imaging unit 12031 may be visible light or invisible light such as infrared light.

The in-vehicle information detection unit 12040 detects in-vehicle information. For example, a driver state detector 12041 that detects the driver's state is connected to the in-vehicle information detection unit 12040. The driver state detector 12041 includes, for example, a camera that captures the driver, and the in-vehicle information detection unit 12040 may calculate the degree of fatigue or concentration of the driver, or may determine whether the driver is dozing based on the detection information input from the driver state detector 12041.

The microcomputer 12051 can calculate the control target value of the driving force generation unit, the steering mechanism, or the braking device based on the information inside and outside the vehicle acquired by the vehicle-exterior information detection unit 12030 or the in-vehicle information detection unit 12040 to output a control command to the drive system control unit 12010. For example, the microcomputer 12051 can perform cooperative control for the purpose of realizing a function of an advanced driver assistance system (ADAS) including vehicle collision avoidance or impact mitigation, follow-up driving based on inter-vehicle distance, vehicle speed maintenance driving, vehicle collision warning, or vehicle lane deviation warning.

In addition, based on the information around the vehicle acquired by the vehicle-exterior information detection unit 12030 or the in-vehicle information detection unit 12040, the microcomputer 12051 can perform cooperative control for the purpose of automatic driving or the like in which the vehicle travels autonomously without depending on the operation of the driver by controlling the driving force generation unit, the steering mechanism, the braking device, and the like.

Further, the microcomputer 12051 can output a control command to the body system control unit 12020 based on the information outside the vehicle acquired by the vehicle-exterior information detection unit 12030. For example, the microcomputer 12051 can control the head lamps according to the position of the preceding vehicle or the oncoming vehicle detected by the vehicle-exterior information detection unit 12030 to perform cooperative control for the purpose of anti-glare such as switching the high beam to the low beam.

The audio image output unit 12052 transmits an output signal of at least one of the audio and the image to an output device capable of visually or audibly notifying the passenger or the outside of the vehicle of information. In the example of FIG. 21, an audio speaker 12061, a display unit 12062, and an instrument panel 12063 are exemplified as output devices. The display unit 12062 may include, for example, at least one of an onboard display and a heads-up display.

Figure 22:
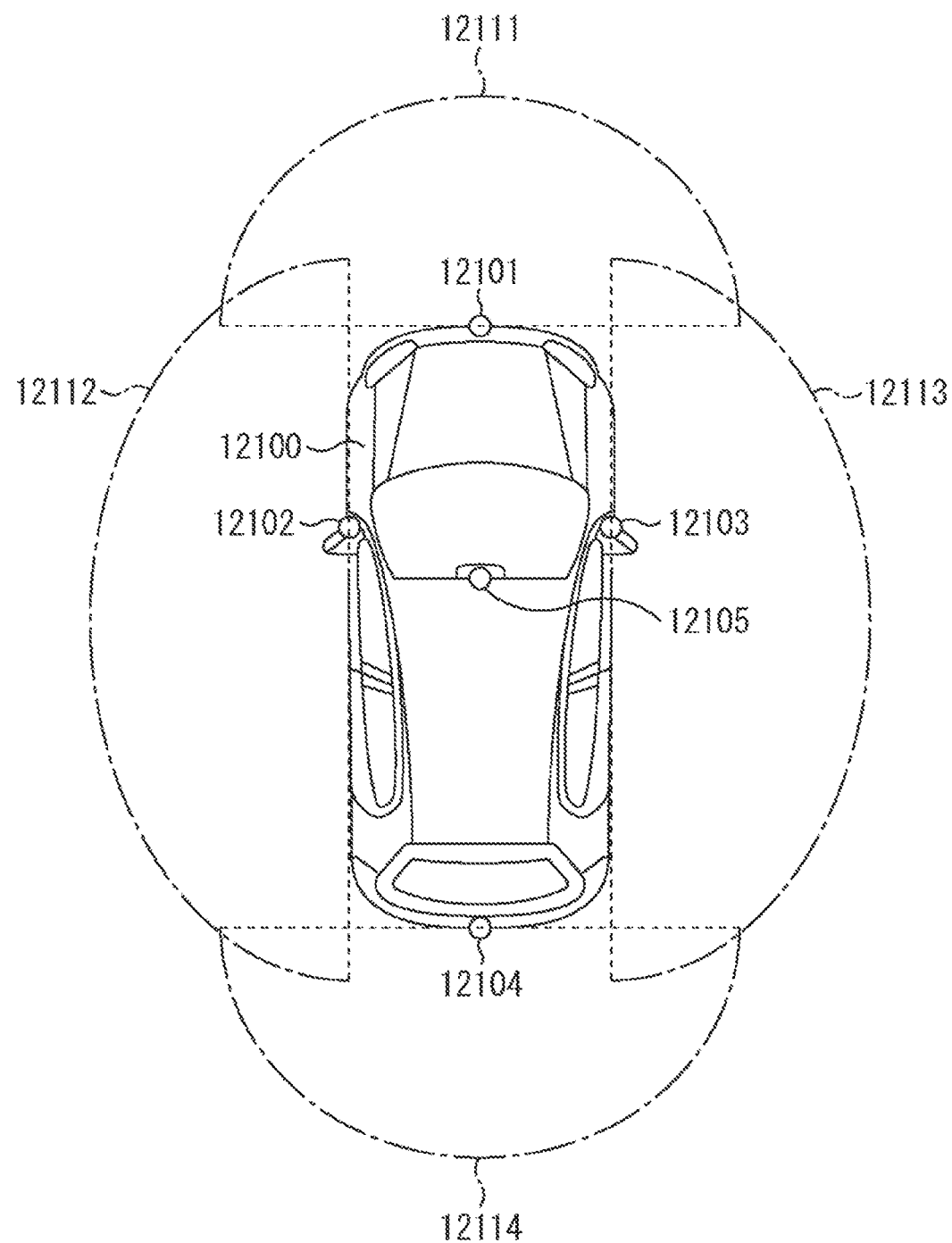
FIG. 22 is an explanatory diagram illustrating an example of installation positions of a vehicle exterior information detector and an imaging unit.

FIG. 22 is a diagram illustrating an example of the installation position of the imaging unit 12031.

In FIG. 22, imaging units 12101, 12102, 12103, 12104, and 12105 are included as the imaging unit 12031.

For example, the imaging units 12101, 12102, 12103, 12104, and 12105 are provided at positions such as the front nose, the side mirrors, the rear bumper, the back door, and the upper part of the windshield in the vehicle interior of a vehicle 12100. The imaging unit 12101 provided on the front nose and the imaging unit 12105 provided on the upper part of the windshield in the vehicle interior mainly acquire an image in front of the vehicle 12100. The imaging units 12102 and 12103 provided on the side mirrors mainly acquire images of the sides of the vehicle 12100. The imaging unit 12104 provided on the rear bumper or the back door mainly acquires an image behind the vehicle 12100. The imaging unit 12105 provided at the upper part of the windshield in the vehicle interior is mainly used to detect a preceding vehicle, a pedestrian, an obstacle, a traffic light, a traffic sign, a lane, or the like.

Note that FIG. 22 illustrates an example of the shooting range of the imaging units 12101 to 12104. An imaging range 12111 indicates the imaging range of the imaging unit 12101 provided on the front nose, imaging ranges 12112 and 12113 indicate the imaging ranges of the imaging units 12102 and 12103 provided on the side mirrors, respectively, and an imaging range 12114 indicates the imaging range of the imaging unit 12104 provided on the rear bumper or the back door. For example, by superimposing the image data imaged by the imaging units 12101 to 12104, a bird's-eye view image of the vehicle 12100 when viewed from above can be obtained.

At least one of the imaging units 12101 to 12104 may have a function of acquiring distance information. For example, at least one of the imaging units 12101 to 12104 may be a stereo camera composed of a plurality of imaging elements, or may be an imaging element having pixels for phase difference detection.

For example, by finding the distance to each three-dimensional object within the imaging ranges 12111 to 12114, and the temporal change of this distance (relative velocity with respect to the vehicle 12100) based on the distance information obtained from the imaging units 12101 to 12104, the microcomputer 12051 can extract, in particular, a three-dimensional object that is the closest three-dimensional object on the traveling path of the vehicle 12100 and that travels in substantially the same direction as the vehicle 12100 at a predetermined speed (for example, 0 km/h or more) as a preceding vehicle. Further, the microcomputer 12051 can set an inter-vehicle distance to be secured in front of the preceding vehicle in advance, and can perform automatic braking control (including follow-up stop control), automatic acceleration control (including follow-up start control), and the like. In this way, cooperative control can be performed for the purpose of automatic driving or the like in which the vehicle travels autonomously without depending on the driver's operation.

For example, the microcomputer 12051 can sort three-dimensional object data related to a three-dimensional object into a two-wheeled vehicle, an ordinary vehicle, a large vehicle, a pedestrian, and other three-dimensional objects such as a utility pole based on the distance information obtained from the imaging units 12101 to 12104 to extract them, and can use them for automatic avoidance of obstacles. For example, the microcomputer 12051 identifies obstacles around the vehicle 12100 as an obstacle that are visible to the driver of the vehicle 12100 and an obstacle that are difficult to see. The microcomputer 12051 can determine the collision risk, which indicates the risk of collision with each obstacle, and when the collision risk is above the set value and there is a possibility of collision, the microcomputer 12051 can provide a driving assistance for collision avoidance by outputting an alarm to the driver via the audio speaker 12061 or the display unit 12062, or by performing forced deceleration and avoidance steering via the drive system control unit 12010.

At least one of the imaging units 12101 to 12104 may be an infrared camera that detects infrared light. For example, the microcomputer 12051 can recognize a pedestrian by determining whether the pedestrian is present in the picked up images of the imaging units 12101 to 12104. Such pedestrian recognition includes, for example, a procedure for extracting feature points in picked up images of the imaging units 12101 to 12104 as an infrared camera, and a procedure of performing a pattern matching process on a series of feature points indicating the outline of an object to determine whether the object is a pedestrian. The microcomputer 12051 determines that a pedestrian is present in the picked up images of the imaging units 12101 to 12104, and when the pedestrian is recognized, the audio image output unit 12052 causes the display unit 12062 to superimpose and display a square contour line for emphasis on the recognized pedestrian. Further, the audio image output unit 12052 may cause the display unit 12062 to display an icon or the like indicating the pedestrian at a desired position.

An example of the vehicle control system to which the technique according to the present disclosure can be applied is described above. The technique according to the present disclosure can be applied to the imaging unit 12031 or the like of the configuration described above.

The embodiments of the present disclosure have been described above, the technical scope of the present disclosure is not limited to the above-described embodiments as they are, and various changes can be made without departing from the gist of the present disclosure. Moreover, the components over different embodiments and modifications may be suitably combined.

Further, the effects in each embodiment described in the present specification are merely examples and are not limited, and other effects may be present.

Furthermore, each of the above-described embodiments may be used alone, or may be used in combination with another embodiment.

Note that the present technology may also be configured as below.

(1)

An imaging device comprising:

a coded mask including two or more kinds of band bus filters that are arranged in a two-dimensional grating pattern and that transmit light of different wavelength bands;

a light receiving unit that receives modulated light modulated by the coded mask and generates observation signal data; and an image reconstruction processing unit that reconstructs the observation signal data generated by the light receiving unit to generate image data.

(2)

The imaging device according to (1), further comprising an image integration unit that restores original image data by integrating one or a plurality of pieces of the image data generated by the image reconstruction processing unit.

(3)

The imaging device according to (1) or (2), further comprising a color filter array including two or more types of color filters that transmit light of different wavelength bands, wherein the light receiving unit receives the modulated light modulated when light is transmitted through the coded mask and the color filter array to generate the observation signal data.

(4)

The imaging device according to (3), wherein the color filter array is disposed between the light receiving unit and the coded mask.

(5)

The imaging device according to (3) or (4), wherein the light receiving unit includes a plurality of pixels each of which receives the modulated light and which generates a pixel value for each pixel in the observation signal data, the plurality of pixels includes a plurality of first pixels on which the modulated light of a first wavelength band is incident and a plurality of second pixels on which the modulated light of a second wavelength band different from the first wavelength band is incident, and the image reconstruction processing unit restores first channel data including the pixel values generated in the plurality of first pixels in the observation signal data and second channel data including the pixel values generated in the plurality of second pixels in the observation signal data by a binary matrix operation process to generate the image data.

(6)

The imaging device according to (5), wherein the image reconstruction processing unit executes the binary matrix operation process using a first modulation matrix on the first channel data, and executes the binary matrix operation process on the second channel data using a second modulation matrix that is a complement matrix of the first modulation matrix.

(7)

The imaging device according to (5) or (6), further comprising:

a weighting unit that weights the pixel value of the first channel data using a predetermined weight coefficient; and a subtraction unit that subtracts the second channel data from the first channel data weighted by the weighting unit or subtracts the first channel data weighted by the weighting unit from the second channel data, wherein the image reconstruction processing unit performs the binary matrix operation process on first or second channel data subjected to the subtraction by the subtraction unit and the second or first channel data.

(8)

The imaging device according to (7), wherein the weighting unit multiplies the pixel value of the first channel data by a predetermined weight coefficient, and the subtraction unit subtracts the second channel data from the first channel data weighted by the weighting unit.

(9)

The imaging device according to (7), wherein the weighting unit divides the pixel value of the first channel data by a predetermined weight coefficient, and the subtraction unit subtracts the first channel data weighted by the weighting unit from the second channel data.

(10)

The imaging device according to any one of (7) to (9), wherein the color filter array includes a first color filter that transmits light of a third wavelength band and a second color filter that transmits light of a fourth wavelength band partially overlapping with the third wavelength band, and the weight coefficient is a value calculated based on a degree of the overlap between the third wavelength band and the fourth wavelength band.

(11)

The imaging device according to any one of (1) to (10), wherein the image reconstruction processing unit is mounted on a chip same as a chip on which the light receiving unit is mounted.

(12)

An electronic device comprising:

a solid-state imaging device; and an information processing device connected to the solid-state imaging device, wherein the solid-state imaging device includes a coded mask including two or more kinds of band bus filters that are arranged in a two-dimensional grating pattern and that transmit light of different wavelength bands, and a light receiving unit that receives modulated light modulated by the coded mask and generates observation signal data, and the information processing device includes an image reconstruction processing unit that reconstructs the observation signal data generated by the light receiving unit to generate image data.

(13)

An information processing method comprising:

receiving modulated light modulated by a coded mask including two or more types of band bus filters that are arranged in a two-dimensional grating pattern and that transmit light of different wavelength bands to generate observation signal data; and reconstructing the generated observation signal data to generate image data.

(14)

A program causing a computer to execute an image process, the program causing the computer to execute a step of reconstructing observation signal data generated by receiving modulated light modulated by a coded mask including two or more types of band bus filters that are arranged in a two-dimensional grating pattern and that transmit light of different wavelength bands to generate image data.

REFERENCE SIGNS LIST

1 ELECTRONIC DEVICE
10 PIXEL
21R, 21G, 21B COLOR FILTER
31A, 231A FIRST FILTER
31B, 231B SECOND FILTER
50, 250 INFORMATION PROCESSING UNIT
51 CHANNEL DIVISION UNIT
52 IMAGE RECONSTRUCTION PROCESSING UNIT
521B CHANNEL IMAGE RECONSTRUCTION PROCESSING UNIT
522G CHANNEL IMAGE RECONSTRUCTION PROCESSING UNIT
523R CHANNEL IMAGE RECONSTRUCTION PROCESSING UNIT
53 IMAGE INTEGRATION UNIT
60 IMAGING DEVICE
61 SOLID-STATE IMAGING DEVICE
62 CONTROLLER
63 SIGNAL PROCESSING UNIT
64 DSP
65 MEMORY
66 OUTPUT UNIT
70 IMAGE PROCESSING PROCESSOR
71 NETWORK
72 SERVER
101 PIXEL ARRAY UNIT 102, 202 COLOR FILTER ARRAY
103, 203 CODED MASK
254 WEIGHT MULTIPLICATION UNIT
255R CHANNEL IMAGE GENERATION UNIT

The invention claimed is:

1. An imaging device, comprising:
a coded mask including a plurality of kind of band pass filters that are arranged in a two-dimensional grating pattern, wherein
the plurality of kind of band pass filters includes a first kind of band pass filter and a second kind of band pass filter,
a size of the first kind of band pass filter is different from a size of the second kind of band pass filter, and
the plurality of kind of band pass filters is configured to transmit light of different wavelength bands;
a color filter array including a plurality of type of color filters that transmit light of different wavelength bands;
a light receiving unit including a plurality of pixels configured to:
receive modulated light modulated by the coded mask and the color filter array, and
generate observation signal data based on the received modulated light, wherein
the observation signal data comprises a pixel value for each of the plurality of pixels, and
the plurality of pixels includes a plurality of first pixels on which the modulated light of a first wavelength band is incident and a plurality of second pixels on which the modulated light of a second wavelength band different from the first wavelength band is incident; and
an image reconstruction processing unit configured to:
reconstruct the observation signal data generated by the light receiving unit, wherein the observation signal data includes first channel data including the pixel values generated by the plurality of first pixels and second channel data including the pixel values generated by the plurality of second pixels,
restore, based on a binary matrix operation process, the first channel data and the second channel data, and
generate image data based on the restored first channel data and the second channel data.

2. The imaging device according to claim 1, further comprising an image integration unit configured to restore original image data based on integration of one or a plurality of pieces of the image data generated by the image reconstruction processing unit.

3. The imaging device according to claim 1, wherein the color filter array is between the light receiving unit and the coded mask.

4. The imaging device according to claim 1, wherein the image reconstruction processing unit is further configured to:
execute the binary matrix operation process, on the first channel data, based on a first modulation matrix, and
execute the binary matrix operation process, on the second channel data, based on a second modulation matrix, wherein the second modulation matrix is a complement matrix of the first modulation matrix.

5. The imaging device according to claim 1, further comprising:
a weighting unit configured to weight the pixel value of the first channel data based on a specific weight coefficient; and
a subtraction unit configured to subtract the second channel data from the first channel data weighted by the weighting unit or subtract the first channel data weighted by the weighting unit from the second channel data, wherein
the image reconstruction processing unit is further configured to perform the binary matrix operation process on the first channel data or the second channel data subjected to the subtraction by the subtraction unit.

6. The imaging device according to claim 5, wherein
the weighting unit is further configured to multiply the pixel value of the first channel data by the specific weight coefficient, and
the subtraction unit is further configured to subtract the second channel data from the first channel data weighted by the weighting unit.

7. The imaging device according to claim 5, wherein
the weighting unit is further configured to divide the pixel value of the first channel data by the specific weight coefficient, and
the subtraction unit is further configured to subtract the first channel data weighted by the weighting unit from the second channel data.

8. The imaging device according to claim 5, wherein
the color filter array includes a first color filter configured to transmit light of a third wavelength band and a second color filter configured to transmit light of a fourth wavelength band,
the fourth wavelength band partially overlaps with the third wavelength band, and
the weight coefficient is calculated based on a degree of the overlap between the third wavelength band and the fourth wavelength band.

9. The imaging device according to claim 1, wherein the image reconstruction processing unit is on a chip same as a chip on which the light receiving unit is mounted.

10. An electronic device, comprising:
a solid-state imaging device, wherein the solid-state imaging device includes:
a coded mask including a plurality of kind of band pass filters that are arranged in a two-dimensional grating pattern, wherein
the plurality of kind of band pass filters includes a first kind of band pass filter and a second kind of band pass filter,
a size of the first kind of band pass filter is different from a size of the second kind of band pass filter, and
the plurality of kind of band pass filters are configured to transmit light of different wavelength bands,
a color filter array including a plurality of type of color filters that transmit light of different wavelength bands, and
a light receiving unit including a plurality of pixels configured to:
receive modulated light modulated by the coded mask and the color filter array, and
generate observation signal data based on the received modulated light, wherein
the observation signal data comprises a pixel value for each of the plurality of pixels, and
the plurality of pixels includes a plurality of first pixels on which the modulated light of a first wavelength band is incident and a plurality of second pixels on which the modulated light of a second wavelength band different from the first wavelength band is incident; and an information processing device connected to the solid-state imaging device, wherein
the information processing device includes an image reconstruction processing unit configured to:
reconstruct the observation signal data generated by the light receiving unit, wherein the observation signal data includes first channel data including the pixel values generated by the plurality of first pixels and second channel data including the pixel values generated by the plurality of second pixels,
restore, based on a binary matrix operation process, the first channel data and the second channel data, and
generate image data based on the restored first channel data and the second channel data.

11. An information processing method, comprising:
receiving, by a plurality of pixels, modulated light modulated by a color filter array and a coded mask, wherein
the color filter array includes a plurality of type of color filters that transmit light of different wavelength bands,
the coded mask includes a plurality of type of band pass filters that are arranged in a two-dimensional grating pattern,
the plurality of type of band pass filters includes a first type of band pass filter and a second type of band pass filter,
a size of the first type of band pass filter is different from a size of the second type of band pass filter, and
the plurality of type of band pass filters is configured to transmit light of different wavelength bands;
generating observation signal data based on the received modulated light, wherein
the observation signal data comprises a pixel value for each of the plurality of pixels, and
the plurality of pixels includes a plurality of first pixels on which the modulated light of a first wavelength band is incident and a plurality of second pixels on which the modulated light of a second wavelength band different from the first wavelength band is incident;
reconstructing the generated observation signal data, wherein the observation signal data includes first channel data including the pixel values generated by the plurality of first pixels and second channel data including the pixel values generated by the plurality of second pixels;
restoring, based on a binary matrix operation process, the first channel data and the second channel data; and
generating image data based on the restored first channel data and the second channel data.

12. A non-transitory computer-readable medium having stored thereon computer-executable instructions, which when executed by a processor of an imaging device, cause the processor to execute operations, the operations comprising:
receiving, by a plurality of pixels, modulated light modulated by a color filter array and a coded mask, wherein
the color filter array includes a plurality of type of color filters that transmit light of different wavelength bands,
the coded mask includes a plurality of type of band pass filters that are arranged in a two-dimensional grating pattern,
the plurality of type of band pass filters includes a first type of band pass filter and a second type of band pass filter,
a size of the first type of band pass filter is different from a size of the second type of band pass filter, and
the plurality of type of band pass filters is configured to transmit light of different wavelength bands;
generating observation signal data based on the received modulated light, wherein
the observation signal data comprises a pixel value for each of the plurality of pixels, and
the plurality of pixels includes a plurality of first pixels on which the modulated light of a first wavelength band is incident and a plurality of second pixels on which the modulated light of a second wavelength band different from the first wavelength band is incident;
reconstructing the generated observation signal data, wherein the observation signal data includes first channel data including the pixel values generated by the plurality of first pixels and second channel data including the pixel values generated by the plurality of second pixels;
restoring, based on a binary matrix operation process, the first channel data and the second channel data; and
generating image data based on the restored first channel data and the second channel data.

* * * * *